(12) United States Patent
Lucas

(10) Patent No.: US 10,751,904 B2
(45) Date of Patent: Aug. 25, 2020

(54) PORTABLE SAWMILL

(71) Applicant: Pilot Pastoral Co. Pty. Ltd., Wooragee, Victoria (AU)

(72) Inventor: Warren Geoffrey Lucas, Wooragee (AU)

(73) Assignee: PILOT PASTORAL CO. PTY. LTD., Victoria (AU)

(*) Notice: Subject to any disclaimer, the term of this patent is extended or adjusted under 35 U.S.C. 154(b) by 0 days.

(21) Appl. No.: 16/132,051

(22) Filed: Sep. 14, 2018

(65) Prior Publication Data
US 2019/0084178 A1 Mar. 21, 2019

(30) Foreign Application Priority Data
Sep. 15, 2017 (AU) .................................. 2017903768

(51) Int. Cl.
*B27B 5/36* (2006.01)
*B27B 7/00* (2006.01)
(Continued)

(52) U.S. Cl.
CPC ............... *B27B 5/36* (2013.01); *B23D 47/02* (2013.01); *B23D 47/12* (2013.01); *B27B 5/207* (2013.01);
(Continued)

(58) Field of Classification Search
CPC ............ Y10T 83/7684; Y10T 83/7755; Y10T 83/7763; Y10T 83/778; Y10T 83/95;
(Continued)

(56) References Cited

U.S. PATENT DOCUMENTS 1,692,735 A * 11/1928 Heger .................... H02K 7/108
192/103 B
3,770,191 A * 11/1973 Blum ....................... B04B 9/12
464/155
(Continued)

FOREIGN PATENT DOCUMENTS

AU 198827314 A 12/1989
AU 199471589 A 3/1995
(Continued)

OTHER PUBLICATIONS

PCT/AU2018/051005 International Search Report and Written Opinion dated Nov. 22, 2018 (8 p.).
(Continued)

*Primary Examiner* — Phong H Nguyen
(74) *Attorney, Agent, or Firm* — Conley Rose, P.C.

(57) ABSTRACT

A sawmill includes a four-stroke internal combustion engine having an output shaft for driving a sawblade. The output shaft has a longitudinal axis. The engine is mounted on the sawmill for rotation between a first operative position with the longitudinal axis of the output shaft extending at a first angle, and a second operative position with the longitudinal axis of the output shaft extending at a second angle transversely to the first angle. The engine has fuel injection to facilitate operation in the first and second operative positions and a lubrication system incorporating a wet sump. An oil pick up for the lubrication system is configured to pick up oil from the wet sump at both the first and second operative positions.

25 Claims, 24 Drawing Sheets

(51) Int. Cl.
| | |
|---|---|
| *B23D 47/02* | (2006.01) |
| *B23D 47/12* | (2006.01) |
| *B27B 5/20* | (2006.01) |
| *B27B 9/04* | (2006.01) |
| *F01M 9/06* | (2006.01) |
| *B27B 5/30* | (2006.01) |
| *B27B 5/06* | (2006.01) |
| *B27B 5/065* | (2006.01) |

(52) U.S. Cl.
 CPC .................. *B27B 7/00* (2013.01); *B27B 9/04* (2013.01); *F01M 9/06* (2013.01); *B27B 5/063* (2013.01); *B27B 5/065* (2013.01); *B27B 5/30* (2013.01)

(58) Field of Classification Search
 CPC  B27B 5/36; B27B 5/207; B27B 5/063; B27B 5/065; B27B 5/30; B27B 7/00; B27B 7/02; B27B 9/00; B27B 9/04; B23D 47/02; B23D 47/12; F01M 9/06
 USPC ................................................ 144/376, 286.1
 See application file for complete search history.

(56) References Cited

U.S. PATENT DOCUMENTS

| | | | |
|---|---|---|---|
| 4,584,918 A | 4/1986 | Stubbe et al. | |
| 5,046,391 A * | 9/1991 | Lewis ................. | B23D 45/024 144/376 |
| 5,273,090 A * | 12/1993 | Klemma ............. | B23Q 9/0085 144/134.1 |
| 5,568,756 A | 10/1996 | Peterson | |
| 5,819,626 A | 10/1998 | Lucas | |
| 5,975,042 A | 11/1999 | Aizawa et al. | |
| 6,213,079 B1 | 4/2001 | Watanabe | |
| 6,283,084 B1 | 9/2001 | Nagai et al. | |
| 7,000,658 B1 * | 2/2006 | Soukiassian ......... | B23D 45/027 144/114.1 |
| 7,530,298 B2 * | 5/2009 | Peterson .................. | B27B 5/207 144/378 |
| 7,584,736 B2 | 9/2009 | Li et al. | |
| 2009/0013959 A1 | 1/2009 | Lin | |
| 2009/0235894 A1 | 9/2009 | Lee et al. | |
| 2011/0067659 A1 | 3/2011 | Sugiyama et al. | |
| 2012/0132171 A1 | 5/2012 | Kurihara | |
| 2012/0132185 A1 | 5/2012 | Kurihara | |
| 2013/0139782 A1 | 6/2013 | Takahashi et al. | |
| 2015/0000633 A1 | 1/2015 | Kurihara | |

FOREIGN PATENT DOCUMENTS

| | | |
|---|---|---|
| AU | 199537989 A | 5/1996 |
| AU | 2002337521 B2 | 11/2006 |
| AU | 2015242997 A1 | 3/2016 |
| GB | 2212101 A | 7/1989 |
| WO | 95/25619 A1 | 9/1995 |
| WO | 2008/153424 A9 | 12/2008 |
| WO | 2009/025565 A3 | 2/2009 |
| WO | 2010/011163 A1 | 1/2010 |
| WO | 2014/066927 A1 | 5/2014 |

OTHER PUBLICATIONS

Australian Search Report dated Jun. 7, 2018, for Australian Application No. 2017903768 (9 p.).

* cited by examiner

PORTABLE SAWMILL

CROSS-REFERENCE TO RELATED APPLICATIONS

This application claims benefit of Australian patent application Serial No. 2017903768 filed Sep. 15, 2017, which is hereby incorporated herein by reference in its entirety.

STATEMENT REGARDING FEDERALLY SPONSORED RESEARCH OR DEVELOPMENT

Not applicable.

FIELD

The present disclosure generally relates to sawmills. In particular, although not exclusively, the disclosure relates to a portable sawmill of the type which can be transported to a remote location and assembled over the top of a felled log in situ. The portable sawmill can then be used to cut the felled log into milled timber. While embodiments disclosed herein are described particularly in respect of a swing blade portable sawmill having a particular frame design, the disclosure has application to other swing blade portable sawmills with other frame designs.

BACKGROUND

Known portable sawmills generally employ a pivoting mechanism where the circular sawblade is able to be oriented in either of two operative positions, namely upright and horizontal, and pivoted therebetween. This is referred to as a "swing blade" sawmill. This enables the sawmill to make longitudinal cuts in the felled log to convert it to elongate pieces of milled timber.

Portable sawmills generally use four-stroke engines. Four-stroke engines are preferable to two-stroke engines because two-stroke engines are loud and vibrate and are therefore less pleasant to work with than four-stroke engines, given that the operator is close to the engine. Additionally, it is not easy to accurately govern revolutions per minute in a two-stroke motor. Governing is important firstly because of the extremely high gyroscopic forces which act on the sawblade when rotating the sawblade between the two operative positions. Secondly, governing is required to set the output speed to match the sawblade manufacturer's recommended blade operating speed. Thus, in a portable sawmill, two-stroke motors also require belts and pulleys to reduce revolutions per minute (rpm) to suit the manufacturer's recommended rpm for the sawblade. The belts and pulleys add to the cost and weight for a portable sawmill. Additionally, two-stroke motors have low fuel efficiency.

Electric and hydraulic motors have also been used as power sources for portable sawmills. However, electric and hydraulic motors require external power sources which limit portability. They also require a gantry arrangement in order to route the electrical or hydraulic conduits to the motor. Such arrangements add complexity of the structure. They increase operating risk and affect maneuverability of the movable saw head.

Therefore, four-stroke motors are typically the motor of choice for a portable sawmill. However, four-stroke motors have other deficiencies in their application to portable sawmills. Typically, the type of four-stroke engines which are available for agricultural and other low cost applications utilise a carburetor and an engine lubrication system with a wet sump. Both of these features require the four-stroke engine to be maintained at a substantially level orientation. Due to these constraints, it is usual for a portable sawmill to use a four-stroke engine that has a power transfer including a centrifugal clutch and a belt drive which drives the pulley on a 90° gearbox. The output of the 90° gear box is coupled to the sawblade. In order to rotate the sawblade from the horizontal to the vertical position, the sawblade and the gearbox are mounted on a swing plate which can be rotated about the pivot axis of the pulley. This configuration allows the four-stroke engine to remain in a substantially level configuration irrespective of the position of the sawblade. However, the belt drive and gearbox merely add to the cost and weight of the portable sawmill. Additionally a known portable sawmill, the Lucas Mill sawmill, uses 4 cast parts for the swing plate and the gearbox giving rise to manufacturing complexity.

Other more complex engines are also known which use a dry sump which is a separate compartment from the crankcase. These arrangements are more complex and costly to manufacture and therefore add to the cost of an item of agricultural machinery intended to have a low cost base.

It is therefore an object of the present disclosure to provide a portable sawmill which reduces the weight and/or complexity and/or number of components. It is also an object of the present disclosure to provide a portable sawmill which provides the public with a useful choice over known portable sawmills.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE DISCLOSURE

In accordance with the first aspect of the present disclosure, there is provided, a sawmill including:

a four-stroke internal combustion engine having: an output shaft for driving a sawblade, the output shaft having a longitudinal axis; and a crankcase having an opening for assembly of at least a crankshaft and piston, and a closure covering the opening;

a support framework, the engine being selectively pivotable relative to a portion of the support framework between a first operative position with the longitudinal axis of the output shaft extending at a sideways angle, and a second operative position with the longitudinal axis of the output shaft extending at a downwards angle transversely to the sideways angle, the engine having fuel injection to facilitate operation in both the first and second operative positions; and a lubrication system for circulating an amount of lubricant corresponding to a predetermined capacity for the engine, wherein the crankcase incorporates a wet sump, wherein the wet sump is defined by a first wet sump region which is open to the crankcase for collection of lubricant in the first operative position of the engine, the lubricant collecting up to a first liquid level in the first wet sump region when said amount of lubricant is supplied to the engine, with the depth of the crankcase being such that the crankshaft is clear of the first lubricant level, the wet sump being further defined by a second wet sump region in the closure for collection of lubricant in the second operative position of the engine, the lubricant collecting up to a second liquid level in the second wet sump region when said amount of lubricant is supplied to the engine, the depth of the closure being greater than the depth of the second lubricant level, wherein the lubrication system includes an oil inlet disposed at an intersection of the first wet sump region and the second wet sump region.

Thus, desirably, the oil inlet will be disposed below the first liquid level for the first operative position and below the second liquid level for the second operative position. This corresponds to a low point of the crankcase for both the first operative position for the second operative position.

The sawmill is preferably a portable sawmill of the type which can be transported to a remote location and assembled over the top of a felled log in situ.

The depth of the first and second wet sump regions when the engine is in respective first and second operative positions is preferably such that clearance is provided between at least the crankshaft, connecting rod or rods, and timing gears, and the first and second lubricant levels respectively. In one embodiment, the depth of the first and second wet sump regions when the engine is in respective first and second operative positions is such that clearance is provided between all moving engine parts and the first and second lubricant levels respectively.

The first wet sump region is open to the crankcase for collection of lubricant in the first operative position of the engine. This may mean no or minimal baffles or partitions separating the first wet sump region from the remainder of the crankcase. Preferably, oil within the crankcase falls directly to the first wet sump region under gravity when the engine is in the first operative position. Thus, preferably, the surface of the lubricant at the first liquid level faces is exposed to at least the crankshaft and optionally other moving parts of the engine. The second wet sump region is preferably open to the crankcase and similar comments may apply. The wet sump regions overlap at said intersection. The first and second wet sump regions may be defined by surfaces of the crankcase and closure which define open trays. The trays may be shallow. The trays overlap at said intersection.

Preferably, the output shaft exits through the closure. Preferably, the output shaft is in-line coupled to a sawblade shaft for mounting of the sawblade i.e. preferably, the output shaft and the saw shaft have aligned longitudinal axes. Preferably, the coupling between the output shaft and the saw shaft is such that the sawblade rotation is in the same direction as the output shaft.

The lubrication system preferably includes a pump to collect oil which is pumped through the lubrication system i.e. the lubrication system is pressure fed. Oil filtration is provided which is only possible with pump fed lubrication systems. Lubrication systems for internal combustion engines which use a pump and a wet sump are well known and need not be detailed further. In a preferred embodiment, there is a single oil inlet for the lubrication system. Furthermore, the single oil inlet may be in fluid communication with a single pump of the lubrication system thereby simplifying the lubrication system. The oil inlet is preferably provided in an oil inlet device which may be tubular. Preferably, the oil inlet device has an enlarged mouth, such as a trumpet mouth at the oil inlet. The oil inlet device may be connected to the pump by way of a conduit. In an alternative embodiment, the oil inlet may be incorporated into the crankcase, such as the timing cover forming part of the crank case.

The location of the oil inlet enables the oil to drain under gravity towards the oil inlet irrespective of whether the engine is in the first operative position or the second operative position. The oil inlet device may be angled towards the corner, with the oil inlet closest to the corner. The oil inlet device may be disposed within the closure (which could function as a timing cover). Preferably the sump is arranged to have sufficient depth of oil in use to remain clear of reciprocating engine parts in both the first and second operative positions.

As provided by embodiments described herein, the engine (and the sawblade once attached), have two operative positions. It is to be understood the term "operative" means that the engine and sawblade are able to operate in that position for the intention of milling timber. Preferably, with the first operative position, the sawblade will make substantially vertical cuts in the timber. Preferably, in the second operative position, the sawblade can make substantially horizontal cuts. Thus, it is preferred that the engine and the sawblade assembly are selectively pivotable 90° from the first operative position to the second operative position and pivotable return to the first operative position. Preferably, the engine and the sawblade are selectively manually adjustable by the operator to pivot between the first and the second operative positions. In a most preferred embodiment, there are only two operative positions, being the first and second operative positions i.e. the first and second operative positions are the only selectable operative positions.

Preferably, the first and second operative positions of the engine extend substantially orthogonal to each other. In a most preferred embodiment, in the first operative position, the longitudinal axis of the output shaft is arranged substantially horizontally and in the second operative position, the longitudinal axis of the output shaft is arranged substantially vertically to extend below the engine.

The sawmill may include a pivot body pivotably mounted to said portion of the support framework with the engine being secured to the pivot body. Preferably, the pivot body includes pivot portions to provide the pivotable mounting and a mounting portion for mounting of the engine. The pivot portions preferably define a pivot axis which extends transversely to the central longitudinal axis of the output shaft and is substantially coincident with the central longitudinal axis. Relative to the length of the shaft(s) the pivot axis is preferably spaced half the diameter of the sawblade along the shaft(s) in the direction away from the sawblade, toward the engine.

The pivot body may further include a housing portion such that the output shaft exited from the engine or motor is enclosed between the pivot body and the engine/motor.

There may be a direct coupling between the output shaft and the saw shaft. However, it is preferred that there is a clutch coupling, most preferably a centrifugal clutch. Additionally, a cush-drive may also be provided. Preferably the housing portion surrounds the clutch and/or the cush-drive. The saw shaft may be supported by a bearing which is surrounded by the housing portion.

The pivot portions, the mounting portion and the housing portion may be formed as a unitary part, most preferably the pivot body including the pivot portions, the mounting portion and the housing portion is a unitarily cast part.

In the assembled sawmill, the pivot body may be pivotable relative to a carriage which is slidable transversely relative to the longitudinal dimension of the sawmill. In turn, the carriage may be mounted on a support frame which is slidable longitudinally on the longitudinal rails, as will be known in the field of portable sawmills. The longitudinal rails are also selectively moveable up and down. These movements which may be selectively effected by the operator enable the sawblade to move relative to the felled log in a manner which allows the sawblade to cut the log into milled timber without movement of the log. Reference is made to our earlier international patent application no. PCT/AU95/00163, the disclosure of which is incorporated by reference.

The fuel injection employed by the four-stroke engine is preferably electronic fuel injection. The engine is preferably a V-twin engine. V-twin is preferred over single cylinder engines because in the larger size needed for this application, a single cylinder engine vibrates too much which is unpleasant for the operator and lowers the performance. The engine is preferably air-cooled. The type of engine is a commercial grade engine. The engine is to undergo constant heavy work, not intermittent use as per garden tools. The horse-power range is within 14-50 hsp, preferably 14-40 hsp, most preferably about 24 hsp. The engine capacity is 500-1000 cc.

As will be understood to those skilled in the field, engines typically have a lubricant capacity (otherwise known as oil capacity). Lubricant capacity is defined as the amount of lubricant the engine is designed to accommodate. Overfilling may lead to excessive oil consumption and underfilling may result in oil pump starvation and severe engine damage. Thus, the engine will have a predetermined lubricant capacity which the wet sump is intended to accommodate—both in the first operative position and in the second operative position.

Any of the features described below may be incorporated into the first aspect of the disclosure.

In accordance with a second aspect of the present disclosure, there is provided, a sawmill including:

an engine or motor having an output shaft for driving a sawblade, the output shaft having a longitudinal axis;

a support apparatus for supporting the engine/motor, the support apparatus including a support framework, the engine/motor being selectively pivotable relative to a portion of the support framework between a first operative position with the longitudinal axis extending at a first angle, and a second operative position with the longitudinal axis extending at a second angle different to the first angle, the support apparatus further including a pivot body to pivotably mount the engine/motor to said portion of the support framework, the pivot body including: pivot portions for pivotable mounting of the pivot body about a pivot axis to said portion of the support framework; a mounting portion to which the engine/motor is secured, the mounting portion surrounding the output shaft; and a housing portion to accommodate the output shaft exited from the engine/motor.

Preferably, the pivot body including the pivot portions, the mounting portion and the housing portion is a unitarily formed cast part. The mounting portion may be formed as a flange at the edge of the housing portion.

Preferably, the first and second operative positions extend substantially orthogonal to each other. In a more preferred embodiment, the first and second operative positions are the only selectable operative positions. In the first operative position, the longitudinal axis of the output shaft is preferably arranged substantially horizontally and in the second operative position, the longitudinal axis of the output shaft is preferably arranged substantially vertically to extend below the engine/motor.

The output shaft may be in-line coupled to a saw shaft via a clutch and the housing portion preferably surrounds the clutch. Furthermore, the output shaft may be in-line coupled to a saw shaft via a cush-drive and the housing portion preferably surrounds the cush-drive. The saw shaft and/or the output shaft may be supported by a bearing which is surrounded by the housing portion.

The pivot body is preferably substantially planar in form with the housing portion being centrally disposed to divide the planar form into two parts either side thereof. The planar pivot body may include stiffening beam portions on both planar surfaces of the pivot body. The stiffening beam portions may include at least one stiffening beam substantially aligned with the pivot axis of the pivot body.

The pivot body may include a battery mounting or receptacle for mounting a battery on the other side of the pivot axis to the engine/motor. In this aspect of the disclosure, the engine/motor is not limited to an internal combustion engine. Electric, hydraulic and other types of motors are included within the scope of the second aspect of the disclosure.

Preferably the sawmill further includes a transfer apparatus for controlling pivoting between the first and second operative positions wherein the transfer apparatus dampens the movement from at least the second operative position to the first operative position and is arranged to provide lift assistance throughout the movement from the first operative position to the second operative position. Preferably the transfer device is connected between said portion of the support framework and the pivot body.

In a most preferred embodiment, the transfer device is in the form of a gas strut or a linear actuator arranged to provide substantially constant dampening from the second operative position to the first operative position and lift assistance throughout the movement from the first operative position to the second operative position.

In another preferred embodiment, the transfer device includes a dampener to provide substantially constant dampening from the second operative position to the first operative position and a mechanical strut to provide lift assistance throughout the movement from the first operative position to the second operative position.

Any of the features described above in connection with the first aspect of the disclosure may be incorporated into the second aspect of the disclosure.

In accordance with a third aspect of the present disclosure, there is provided, a pivot body to pivotably mount an engine or motor to a portion of a support framework, the pivot body including:

pivot portions for pivotable mounting of the pivot body about a pivot axis to said portion of the support framework;

a housing portion having a mouth to receive an output shaft the engine/motor; and a peripheral mounting portion at the mouth of the housing portion for mounting of the engine/motor.

The pivot body preferably includes the pivot portions, the mounting portion and the housing portion as a unitarily formed cast part.

The housing portion preferably forms an enclosure open at one end at the mouth and open at an end opposite to the mouth. The pivot body may be substantially planar in form with the housing portion being centrally disposed to divide the planar form into two parts either side thereof. The mounting portion may be formed as a flange at the mouth of the housing portion. The planar pivot body may include stiffening beam portions on both planar surfaces of the pivot body. The stiffening beam portions may include at least one stiffening beam substantially aligned with the pivot axis of the pivot body.

The pivot body preferably includes a battery mounting or receptacle for mounting a battery on the other side of the pivot axis to the mounting portion.

Any of the features described above in connection with the first and aspects of the disclosure may be incorporated into the third aspect of the disclosure.

It will be understood that the embodiments disclosed and defined in this specification extends to all alternative combinations of two or more of the individual features mentioned or evident from the text or drawings. All of these different combinations constitute various alternative aspects of the disclosure.

Further aspects of the present disclosure and further embodiments of the aspects described in the preceding paragraphs will become apparent from the following description, given by way of example and with reference to the accompanying drawings.

BRIEF DESCRIPTION

In order that the disclosure may be more fully understood, an embodiment will now be described, by way of example, with reference to the figures in which.

DETAILED DESCRIPTION

Figure 6:
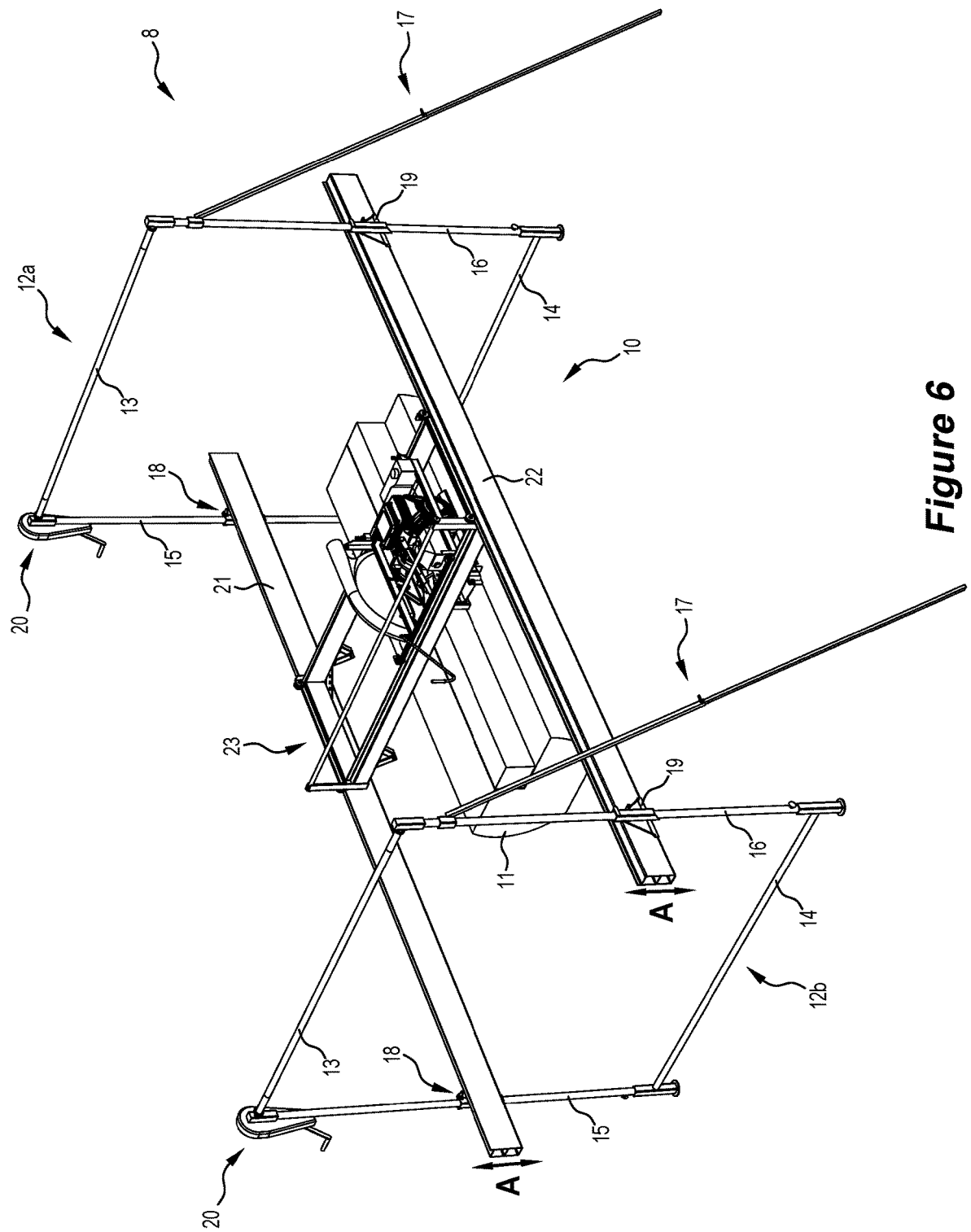
FIG. 6 is a perspective view of a portable sawmill incorporating the engine and sawblade assembly with the pivot body of FIGS. 4 and 5 over the top of a felled log.
Figure 7:
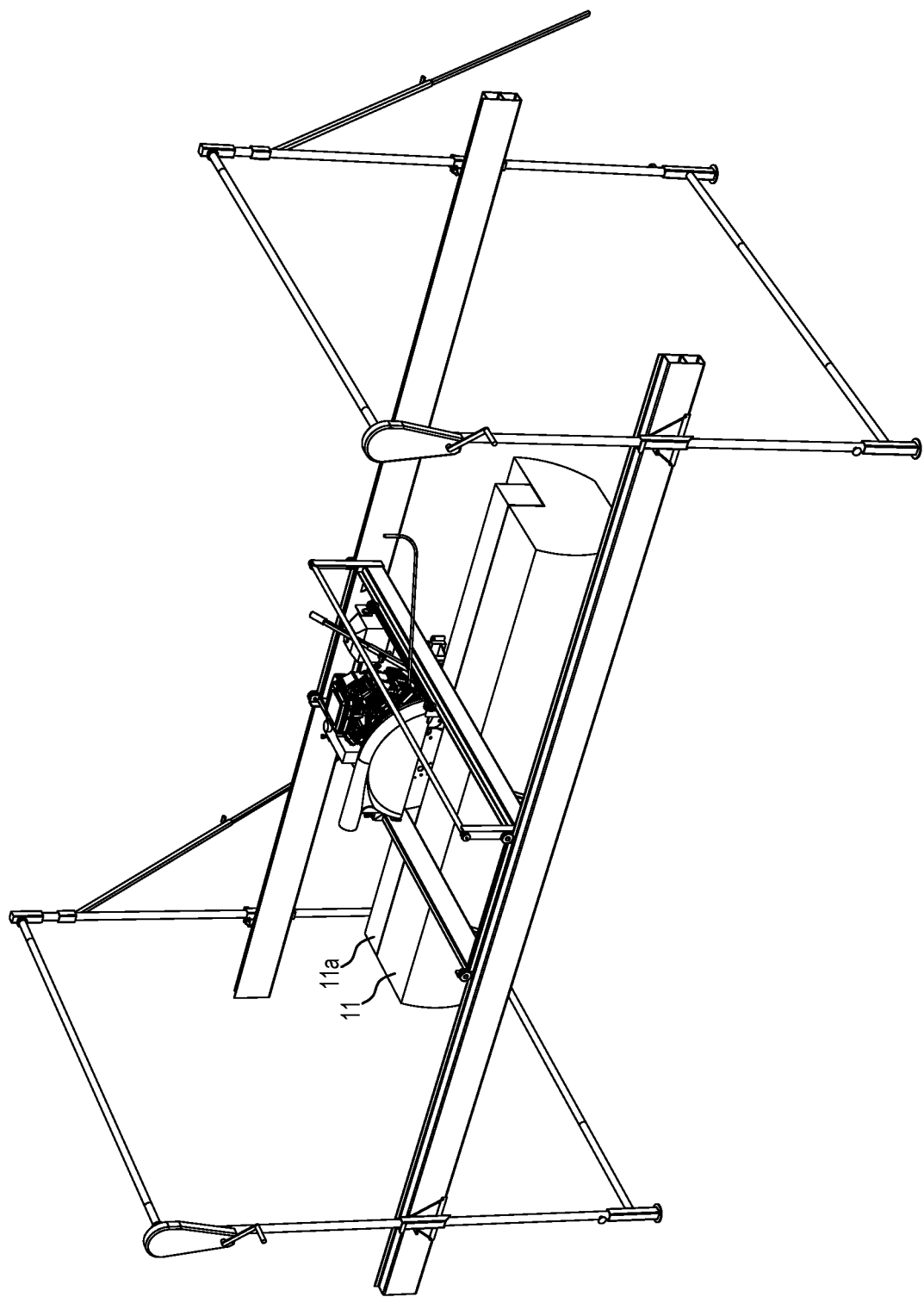
FIG. 7 is an alternative perspective view of the portable sawmill of FIG. 6.

FIG. 6 is similar in some respects to a known form of a Lucas Mill portable sawmill described in our earlier international patent application PCT/AU95/00163 for a "Portable sawmill", the details of which are included herein by reference. Details of the Lucas Mill portable sawmill, including more modern aspects to that described in the above patent application will be understood by those skilled in the art. The general form of the portable sawmill 8 will firstly be described with reference to FIGS. 6 to 10.

Support Apparatus

Figure 14:
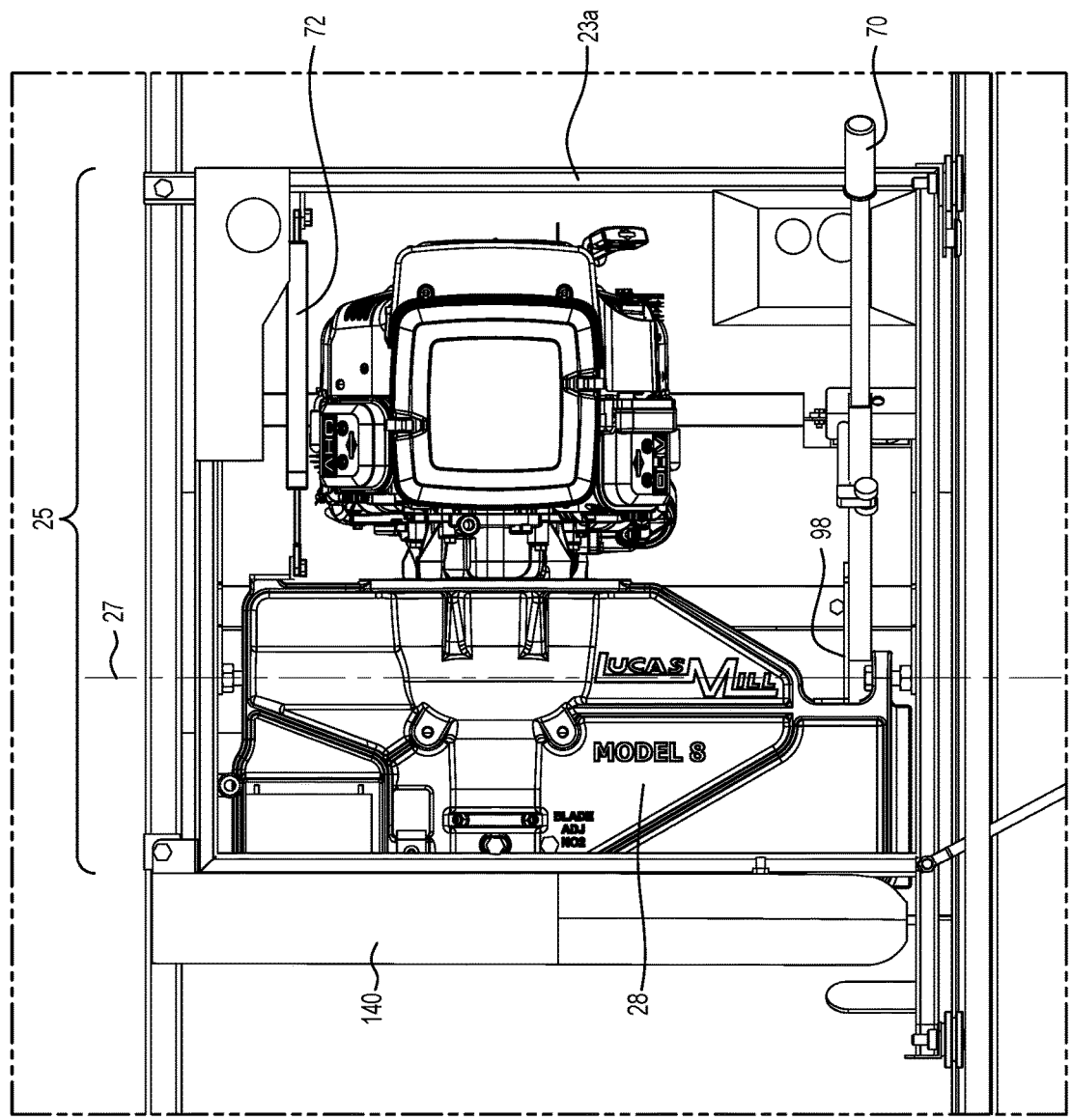
FIG. 14 is a detailed top view of the carriage on which the pivot body and engine is pivotably mounted, with the output shaft oriented in a horizontal position and the sawblade in a vertical cut position.

Turning to FIG. 6, a support apparatus for the engine includes a rectangular support framework 10, support frame 23, carriage 23a (see FIG. 14) and pivot body 28 (see FIG. 14).

Support Framework

Returning to FIG. 6, the framework 10 is set up in the field over a felled log 11 which is ready for milling. The framework includes rectangular end frames 12a and 12b. Each end frame 12a, 12b comprises upper and lower members 13 and 14 respectively and side members 15 and 16 respectively. A telescopic brace means 17 is shown propping each end frame 12a, 12b in a substantially upright position. Being telescopic, the length of the brace means 17 can be adjusted.

One end of the brace means 17 is coupled to the side member 16 while the other end engages with the ground. During set up of the end frames 12a, 12b, the telescopic brace means 17 lie in a plane substantially at right angles to the plane of the end frame. Brace means 17 thus provide lateral support to the end frames 12a, 12b while assembling the mill.

Side members 15 and 16 are respectively fitted with brackets 18 and 19 which are slidable up and down the side member 15, 16. Each bracket has a ledge on which a rail 21, 22 can be supported. A winding means 20 shown associated with each of the upper member 13 and corresponding side member 15 or 16 is provided to wind the brackets 18, 19 up and down via a pulley mechanism in a manner which will be known to persons skilled in the art and as described in our earlier patent application.

Longitudinal rails 21 and 22 are shown as spanning between the corresponding side members 15 and 16 of the end frames 12a and 12b. The longitudinal rails 21 and 22 are engaged with the slidable brackets 18 and 19. Each side rail is accordingly adjustable up or down (as indicated by the arrows A) by movement of the slidable brackets 18 and 19 on the side members 15 and 16 respectively.

In the operating position, the brace means 17 are shown as located, such as to provide lateral support to the whole support framework whilst sawmilling.

Support Frame

Figure 8:
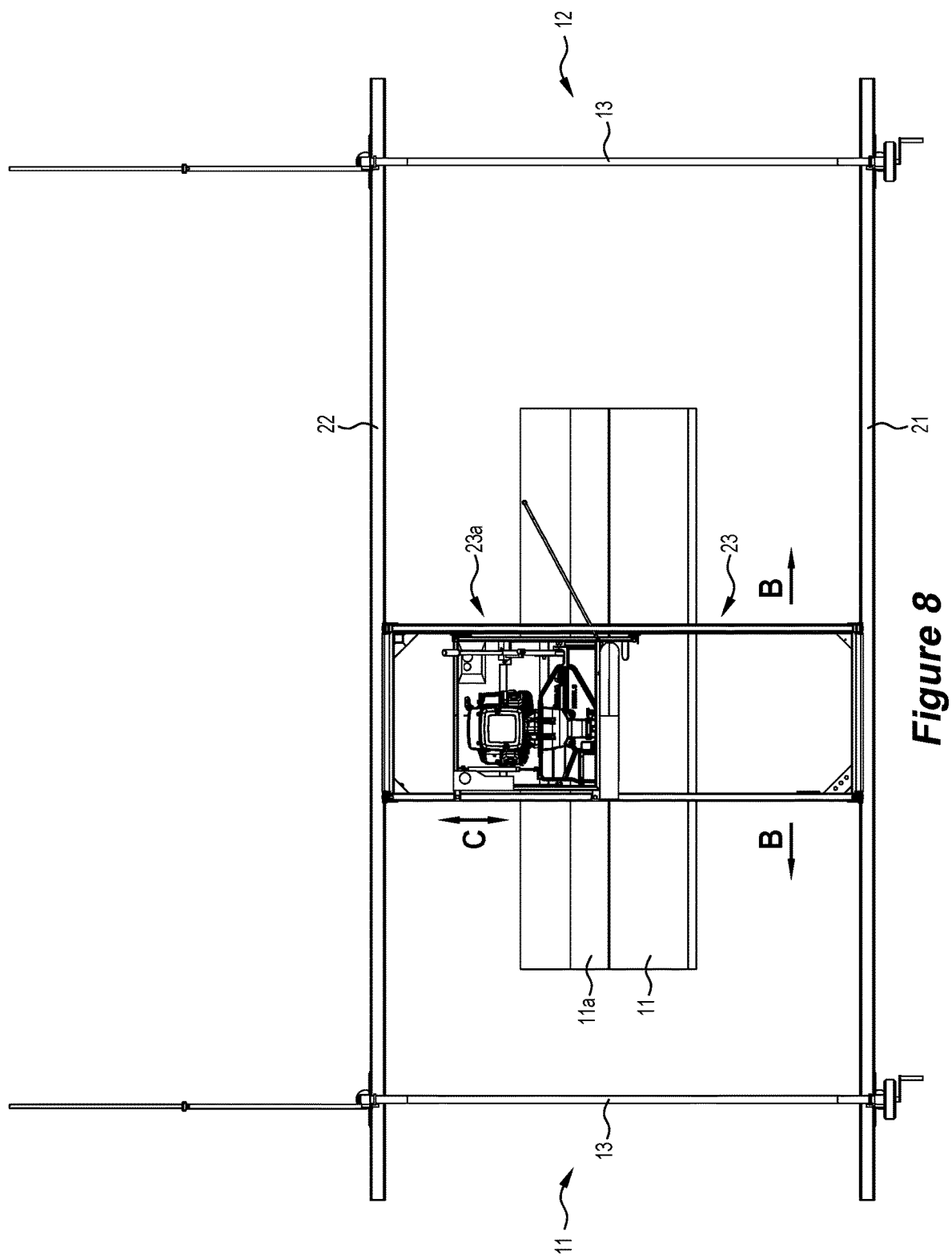
FIG. 8 is a top view of the portable sawmill of FIG. 6.
Figure 9:
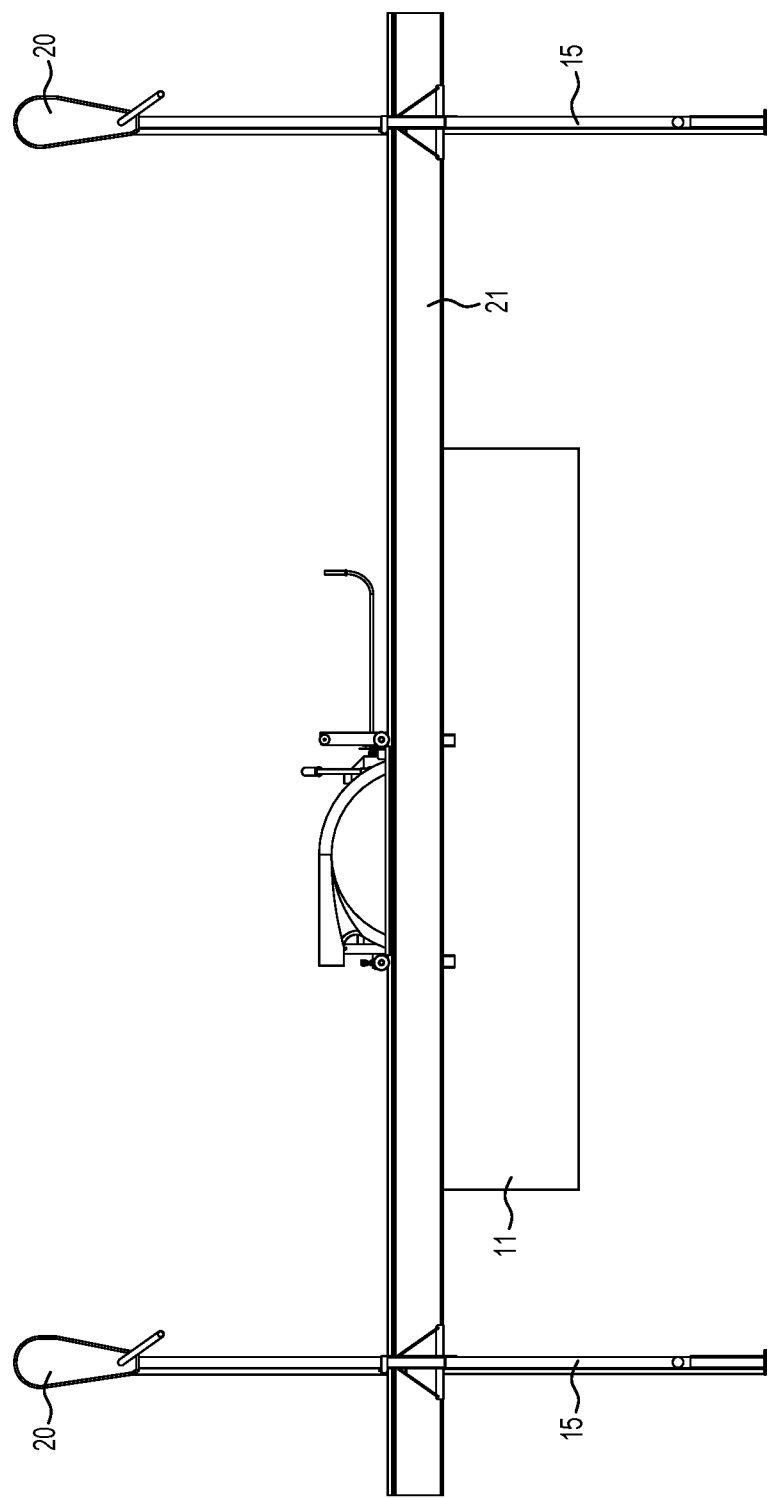
FIG. 9 is a side view of the portable sawmill of FIG. 6.
Figure 10:
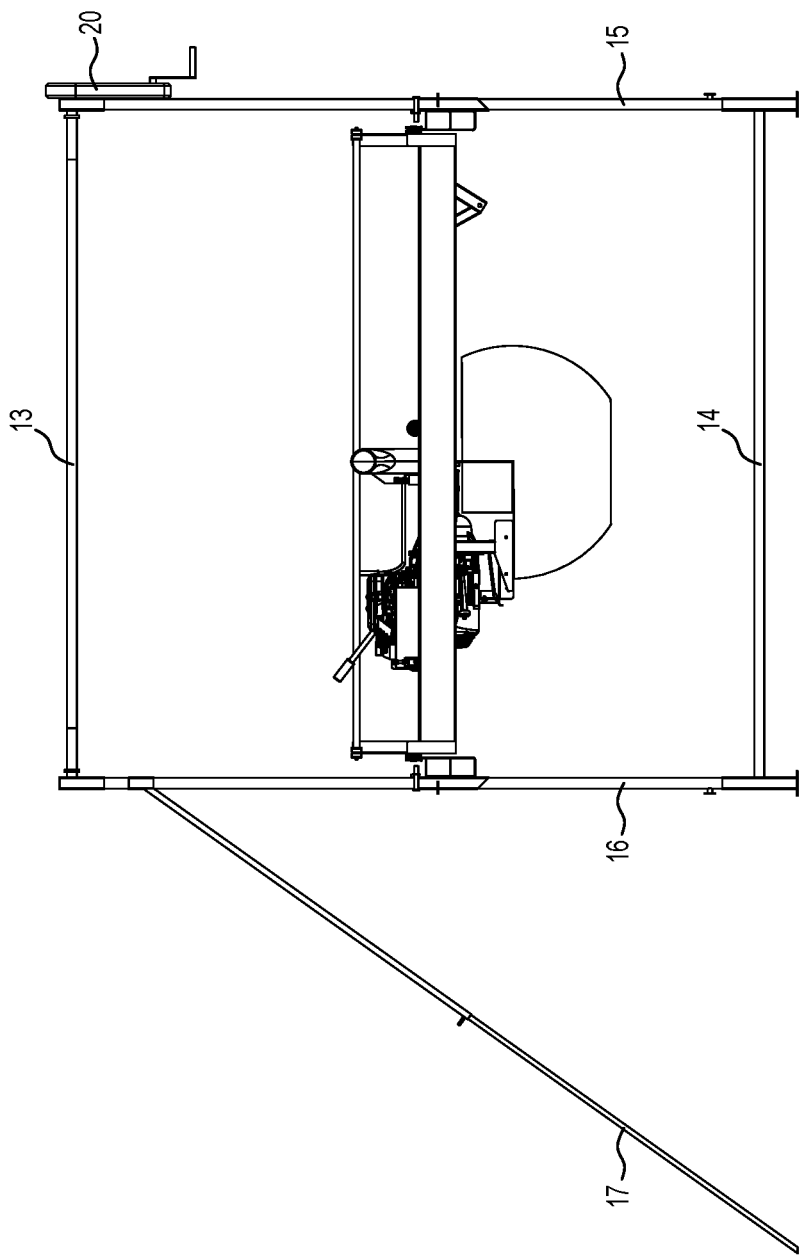
FIG. 10 is an end view of the portable sawmill of FIG. 6.
Figure 11:
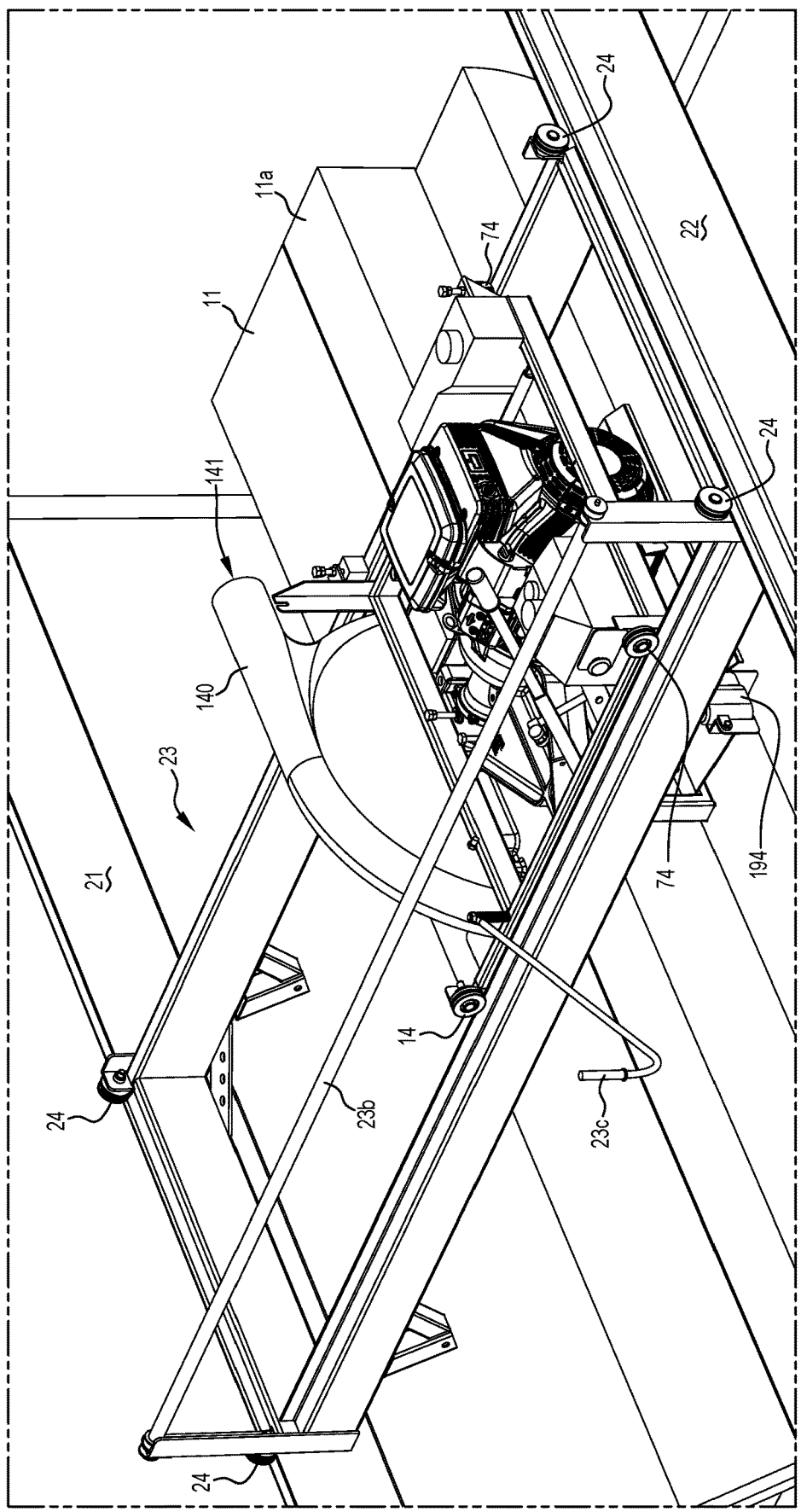
FIG. 11 is a detailed view of a portion of the support framework of FIG. 6, more specifically the support frame, with the engine shown with the output shaft in the horizontal position.

As best shown in FIGS. 8 and 11, a support frame 23 is shown spanning between the longitudinal rails 21 and 22. Wheels 24 are provided at each end of the support frame 23 whereupon the support frame 23 is movable on the side rails 21 and 22 in a longitudinal direction relative to the frame 10 as shown by the arrows B (see FIG. 8). Thus the support frame 23 can be moved along the rails toward or away from the respective end frames 12a and 12b.

Carriage

A carriage 23a is mounted on the support frame 23 for movement relative to the support frame 23. As best shown in FIG. 11, the carriage 23a is mounted by four wheels 74 so that it is movable along the long sides of the support frame 23. The carriage 23a is thus moveable transversely relative to the support framework 10 and longitudinally relative to the support frame 23 as shown by arrows C in FIG. 8. This carriage 23a supports the engine and sawblade assembly 25 (see FIG. 14). Thus, by a combination of the movement of rails 21 and 22 (arrows A), the movement of support frame 23 along rails 21 and 22 (arrows B) and the movement of carriage 23a relative to support frame 23 (arrows C), the position of the engine and sawblade assembly 25 relative to support framework 10 can be readily adjusted in 3 dimensions to most locations within the framework 10.

Brief Details of Pivot Body

FIG. 14 illustrates the form of a pivot body 28 which supports the engine and sawblade assembly 25 on the carriage 23a for pivotable mounting about a pivot axis 27. The features of the pivot body 28 will be subsequently described in more detail.

An actuator in the form of a change-over handle 70 (as per FIGS. 12 and 13) is provided to enable the operator to selectively manually pivot the engine and sawblade assembly 25 between the two operative positions.

Figure 4A:
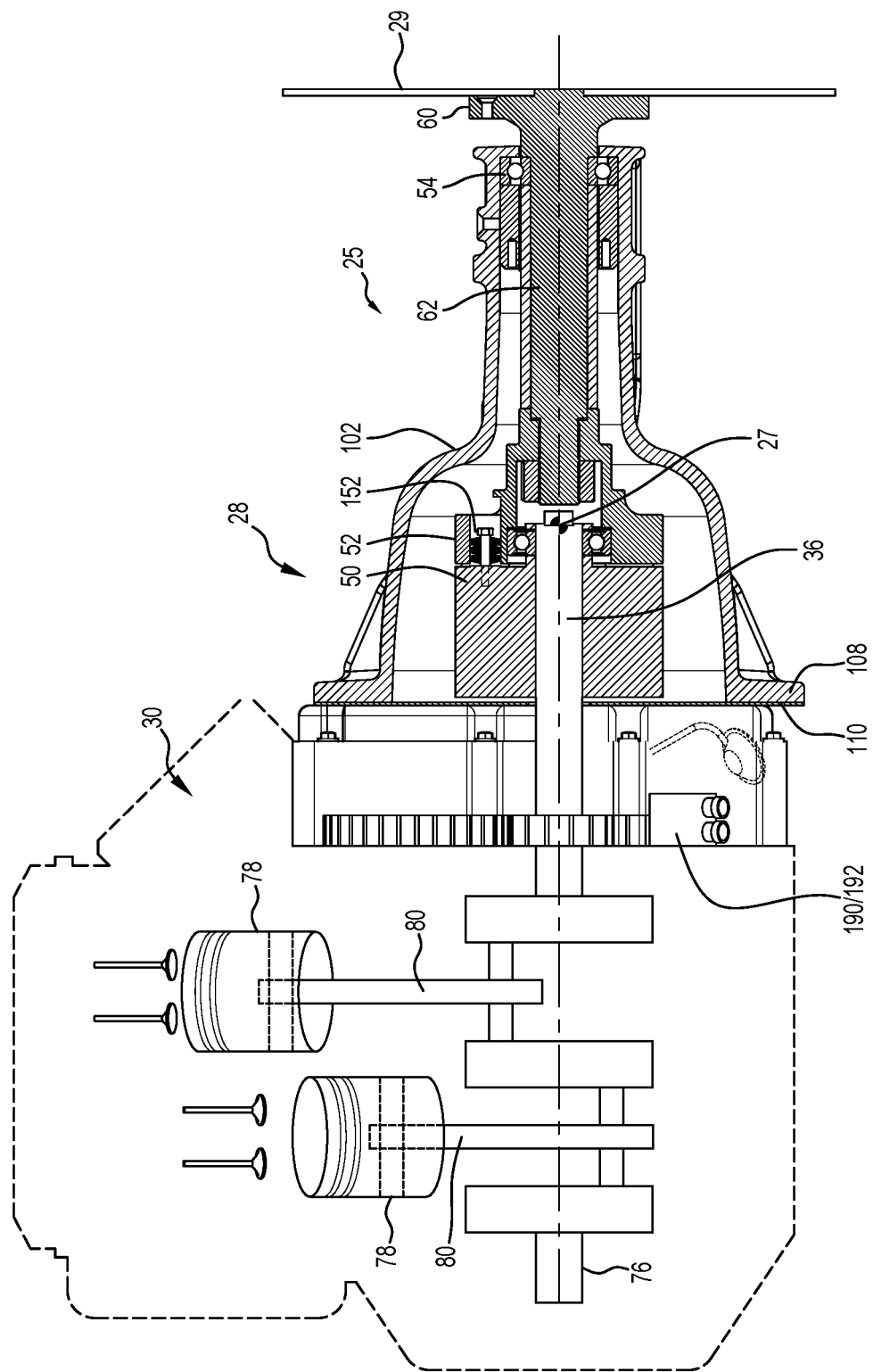
FIG. 4A is an enlarged side view illustrating the coupling of the engine to a sawblade with the crankshaft horizontal and the sawblade in the vertical cut position with an upright cross-section through a pivot body for pivotable mounting of the engine.
Figure 5:
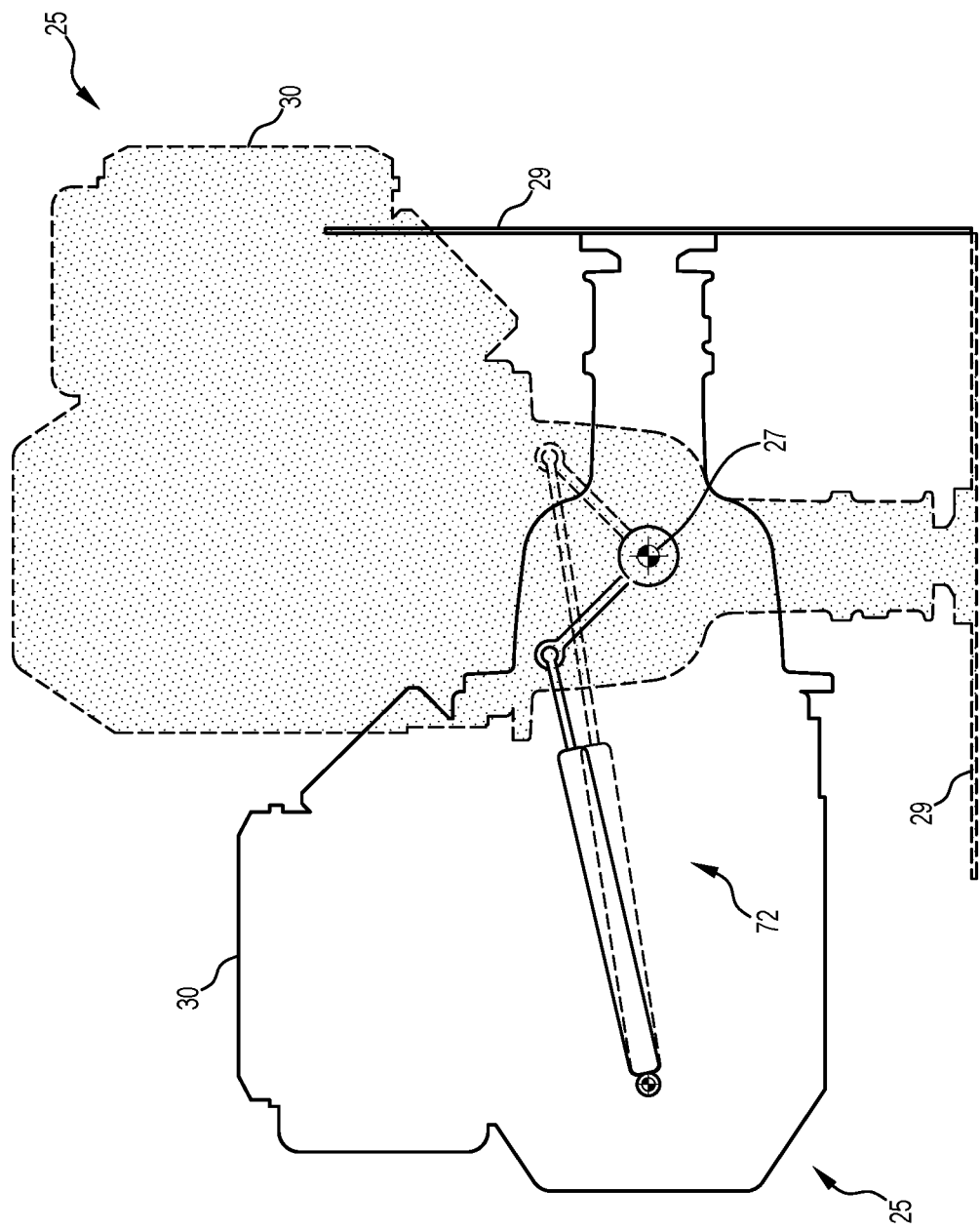
FIG. 5 is a diagrammatic view illustrating the two discrete positions of the engine and sawblade assembly, one shown in solid lines with the crankshaft horizontal and the sawblade in the vertical cut position and the other shown in phantom with the crankshaft vertical and the sawblade in the horizontal cut position.

FIG. 5 illustrates the engine and sawblade assembly 25. By virtue of the pivot body (not shown in FIG. 5), the engine and sawblade assembly 25 may pivot about the pivot axis 27 between two discrete operative positions as shown. As per FIG. 4A, the pivot axis 27 lies along and transversely to the rotational axis of the output shaft 36 and/or sawmill shaft 62 or closely adjacent thereto. The pivotal mounting enables the engine and sawblade assembly 25 to adopt a first operative position in which the sawblade 29 is disposed in a substantially upright configuration for a vertical cut and a second operative position in which the sawblade 29 is disposed in a substantially horizontal configuration for a horizontal cut.

Sawmill Operation

The rotation of the sawblade 29 between these two discrete operative positions together with the movability relative to the framework in directions A, B and C enables the portable sawmill 8 to mill a felled log 11 into milled timber.

As will be understood by those familiar with portable sawmills, the height position (arrows A) for a cut is firstly selected by adjusting the height of the rails 21, 22 on the end frames 12a, 12b using the manual winding means 20. The lateral position of the blade can be selectively adjusted by lateral adjustment of the carriage 23a on the support frame 23 (arrows C). Adjustment to select the first or second operative position is also made prior to making a cut.

When the operator is ready to make a cut, the operator pushes the support frame 23 along the longitudinal rails, 21, 22 by pushing on push bar 23b (see FIG. 11) and the sawblade 29 passes through the log 11. The operator then draws the support frame 23 back past the log 11 by pulling on the pull bar 23c.

When the operator is ready to make the first initial horizontal cut, the operator pushes the support frame 23 along the longitudinal rails, 21, 22 by pushing on push bar 23b (see FIG. 11) and the sawblade pushes through the log 11. Then the operator pivots the blade from horizontal to vertical. The operator then draws the support frame 23 back through the log 11 in the vertical cut by pulling on pull handle 23c. On return, the operator makes the adjustments (any or all of A, C and selection between first and second operative positions) and the process repeats until the log is sawn into milled timber. All movements are manually effected and manually powered.

Pivot Body

Figure 4B:
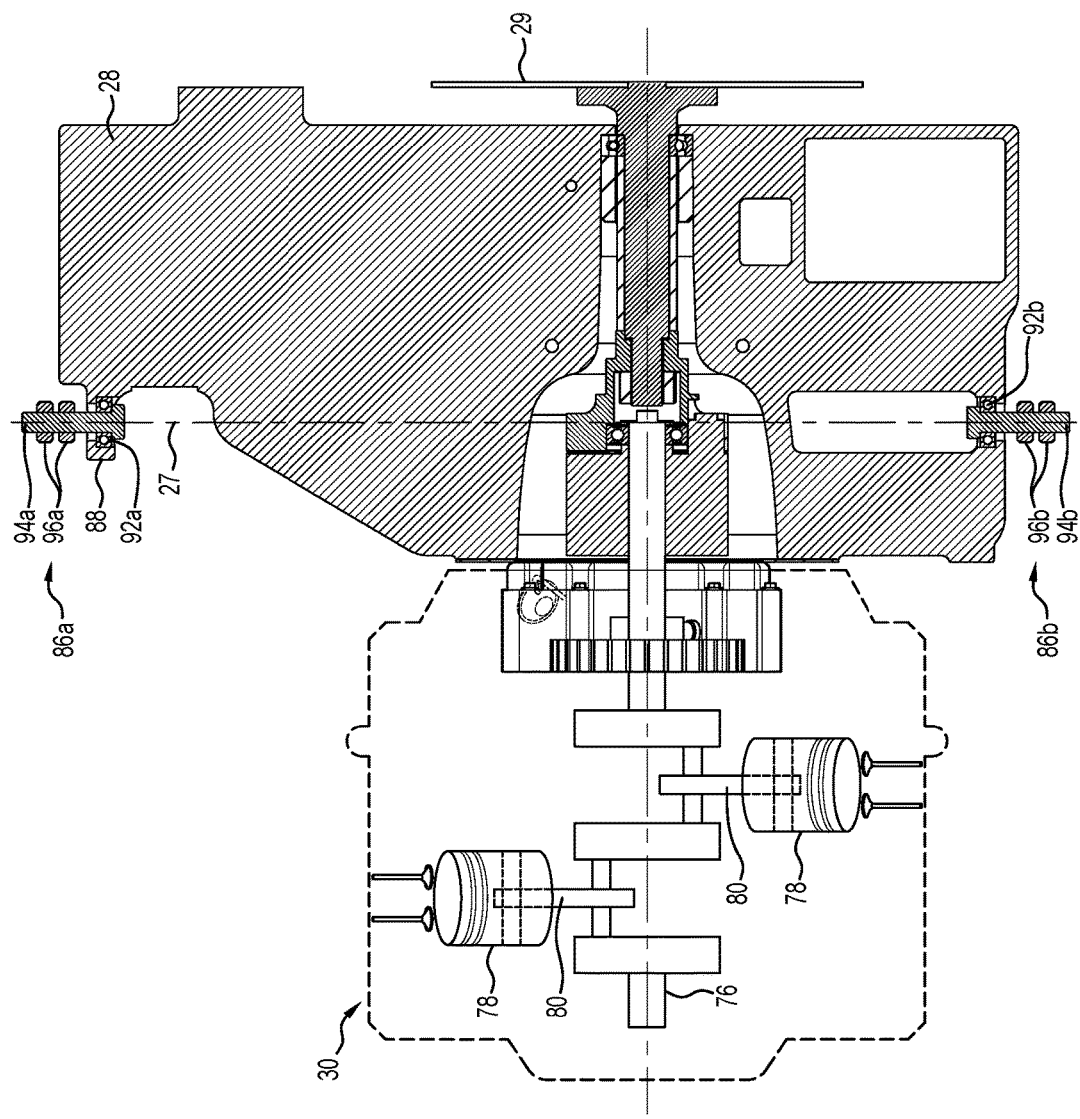
FIG. 4B is an enlarged top view of the engine and sawblade assembly of FIG. 4A with the crankshaft horizontal and the sawblade in the vertical cut position with a horizontal cross-section through the pivot body.

As shown in FIGS. 4A and 4B, the engine 30 is mounted to the pivot body 28 which is pivotably mounted to the carriage 23A. The pivotal mounting of the pivot body 28 enables the engine and sawblade assembly to adopt the two discrete positions illustrated in FIG. 5. With reference to FIGS. 4A-4G, the pivot body 28 has a substantially planar form defined by multiple plate sections 84. The pivot body is somewhat rectangular in overall shape as can be seen from FIG. 4F. The pivot axis 27 runs in the lengthwise direction of the pivot body 28. The pivot body 28 defines pivot portions 86 at each end of the pivot body. The first pivot portion 86a is provided on a projection 88 from the pivot body 28. A second pivot portion 86b is provided at the other end of the pivot body 28 within a shell portion 90 of the pivot body. The shell portion 90 is a half-cylindrical shell with a hollow being provided on the underside of the pivot body 28. This defines a hollow and access point for insertion of a bearing 92b into a bearing recess and seat provided in the shell portion 90. The bearing 92b provides a pivotal mounting for a pivot pin 94b. The pivot pin 94b is fastened by two lock nuts 96b to one side of the carriage 23A.

Likewise, the extension 88 at the first pivot portion 86a also provides a seat for a bearing 92a which provides a pivotable mounting for the pivot pin 94a which is secured to the other side of the carriage 23a by lock nuts 96a. The pivot body 28 is therefore able to pivot about the pivot axis 27 by virtue of the pivotal connections.

Referring back to FIG. 4F, it can be seen that the extension 88 defines a recess 90. As shown in FIG. 14, the recess 90 receives an L-shaped mounting bracket 98 which is fixedly secured to the changeover handle 70 which is used to pivot the pivot body 28 between the first and second operative positions.

Figure 4C:
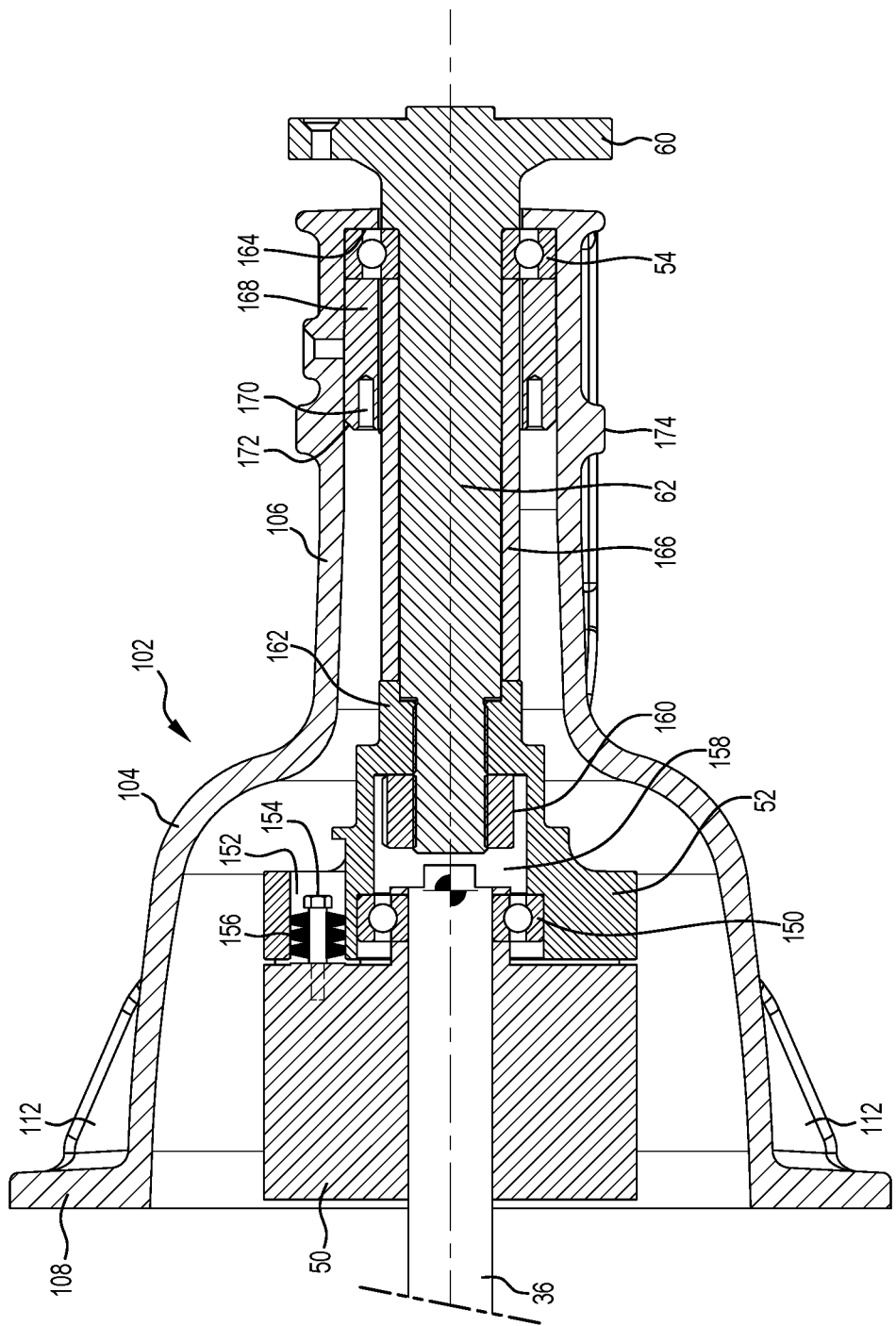
FIG. 4C is a detailed cross section through the pivot body of FIG. 4A showing the internal components of the pivot body.
Figure 4D:
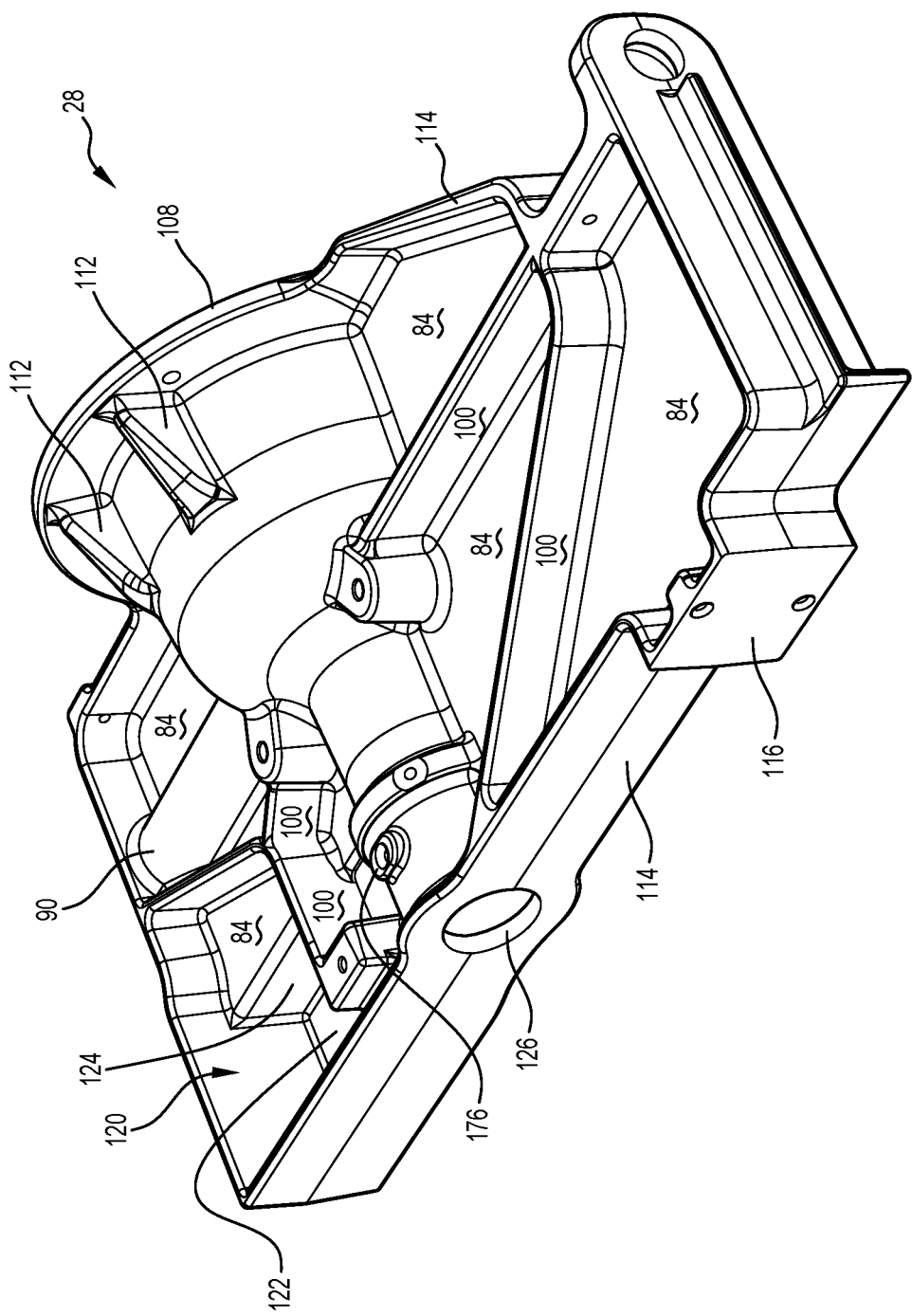
FIG. 4D is a perspective view from above and from a sawblade end of the pivot body.
Figure 4E:
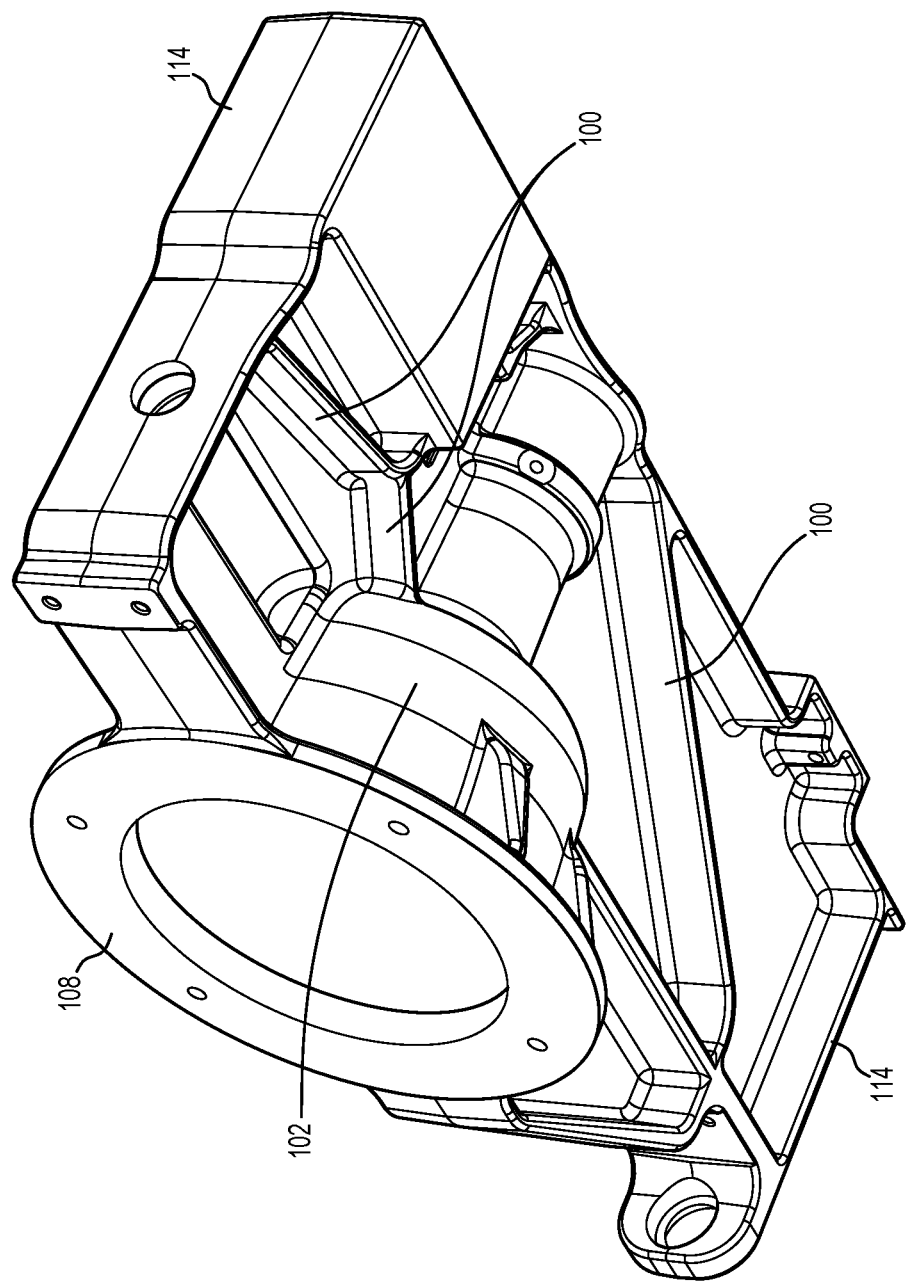
FIG. 4E is a perspective view from below and an engine end of the pivot body shown in FIG. 4D.

As can be seen in FIGS. 4D and 4E, the pivot body 28 also includes stiffeners 100 on both sides of the plate-like body. As can be seen from FIG. 4F, one of these stiffeners 100 is somewhat aligned with the pivot axis 27 which is approximately aligned with the half-shell portion 90 on either side of a housing portion 102. The alignment of the stiffener 100, the housing portion 102 and the shell portion 90 provides for increased stiffness in the region of the pivot axis 27.

As will be best appreciated from FIGS. 4C and 4E, the mounting portion 102 is a hollow body of revolution and includes a first bell-shaped portion 104 and a second approximately cylindrical portion 106. The bell-shaped portion 104 is contiguous with the quasi-cylindrical portion 106 to define a trumpet shape. Both portions 104, 106 have a progressively decreasing diameter. This is to facilitate removal of the internal casting component from the interior of the housing portion 102.

The pivot body 28 also includes a mounting portion 108 in the form of a peripheral flange at the mouth of the bell-shaped portion 104. As shown in FIG. 4A, the engine 30 is bolted to the mounting portion 108 with an intervening dust plate 110.

As per FIG. 4C, externally of the bell-shaped portion 104, buttresses 112 extend between the bell-shaped portion 104 and the flange 108. The buttresses 112 increase the torsional rigidity of the annular mounting portion 108. The torsional rigidity of the annular mounting portion is important because of the gyroscopic forces exerted by the engine 30 onto the pivot body 28, particularly when the pivot body 28 is rotating between the first and second operative positions. Thus, the bell-shaped portion 104, the arrangement of the annular mounting portion 108 at the mouth of the bell-shaped portion 104 which itself is annular, and the buttresses 112 create a body having torsional rigidity.

The rigidity or bending stiffness of the pivot body is enhanced by a peripheral stiffener 114 which extends about the external periphery of the pivot body 28.

Figure 20:
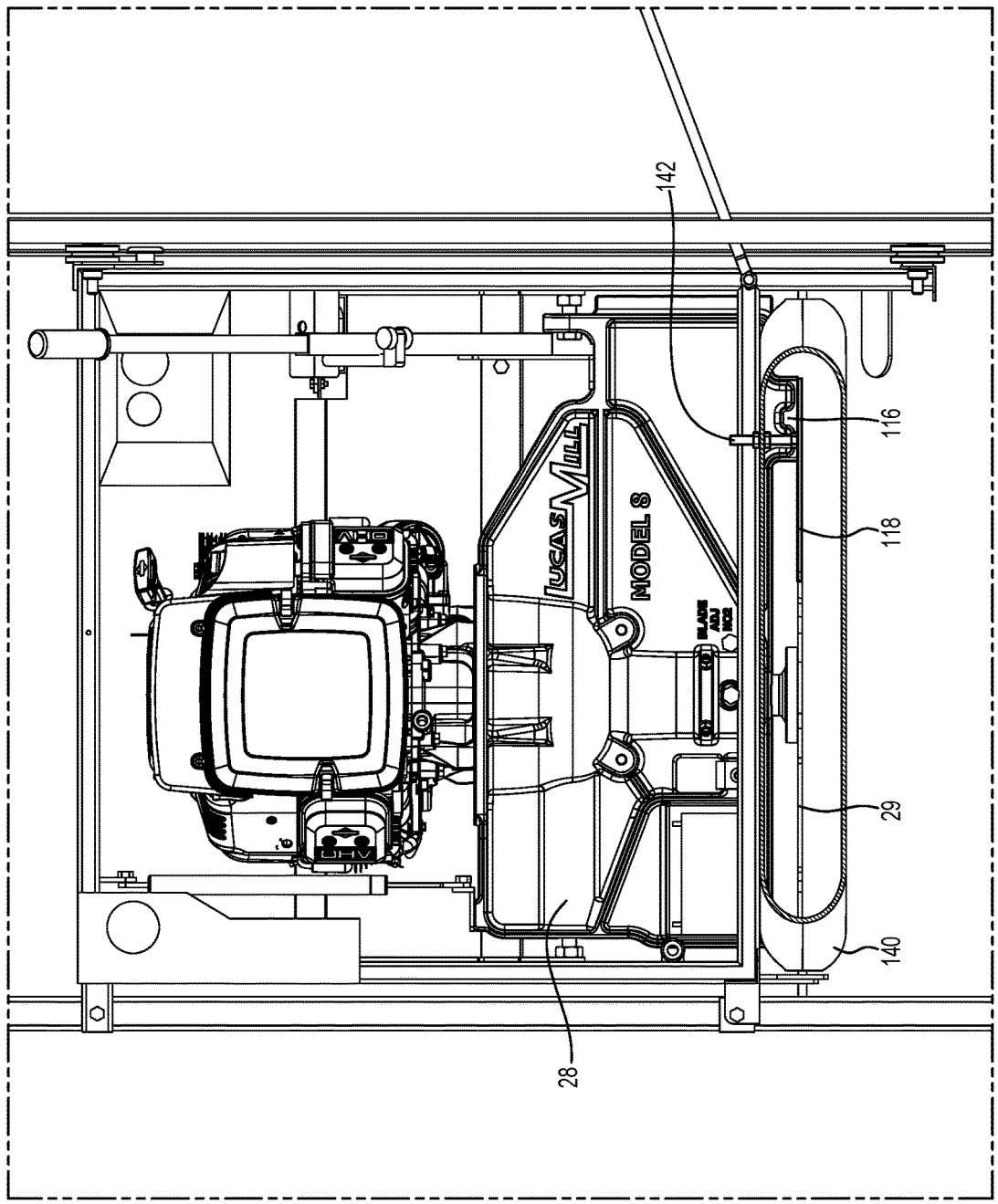
FIG. 20 is a top view of the support frame of FIG. 17 with the top of the saw guard cut away.

The peripheral stiffener 114 also incorporates a mounting plate 116 for a safety guard in the form of a riving knife 118. The riving knife can be seen in FIGS. 16 and 20 and aligns with the sawblade 29. The riving knife is crescent-shaped in form and lies between the sawblade 29 and the operator to provide a measure of protection to prevent inadvertent operator contact with the spinning blade 29 and to stop entry into horizontal cuts in the wrong direction.

As can be seen from FIGS. 4D and 4E, the pivot body 28 also includes a battery mounting receptacle 120. The base 122 of the battery mounting receptacle 120 is stepped down compared to the level of the plate sections 84. The battery mounting receptacle 120 is thus surrounded on 4 sides by portions of the peripheral stiffener 114; the step 124 between the base 122 and the adjacent plate section 84; and one of the internal stiffeners 100. The battery receptacle 120 houses a battery (not shown) which is retained therein by a retaining means (not shown) secured to the pivot body 28. As can be seen, the battery receptacle 120 is disposed on the opposite side of the pivot axis 27 to the engine 30. The battery will thus act as a partial counterweight to the weight of the engine 30. The battery will also be placed in a convenient location for saw sharpening which uses battery power.

As can be seen from FIG. 4D, the peripheral stiffener 114 includes a circular opening 126 which aligns with the quasi-cylindrical portion 106 of the housing portion 102. The opening 126 is for exit of the saw shaft 62 as shown in FIG. 4A.

The distance between the pivot axis 27 and the mounting portion 116 for the riving knife will be such that it positions the riving knife 118 at a position aligned with the sawblade. The distance between the pivot axis 27 and the mounting portion 116 for the riving knife corresponds to approximately half of the diameter of the sawblade 29.

The centre of gravity for the pivot body with the fully assembled engine and sawblade assembly 25 is within the engine itself.

Gas Strut

Figure 15:
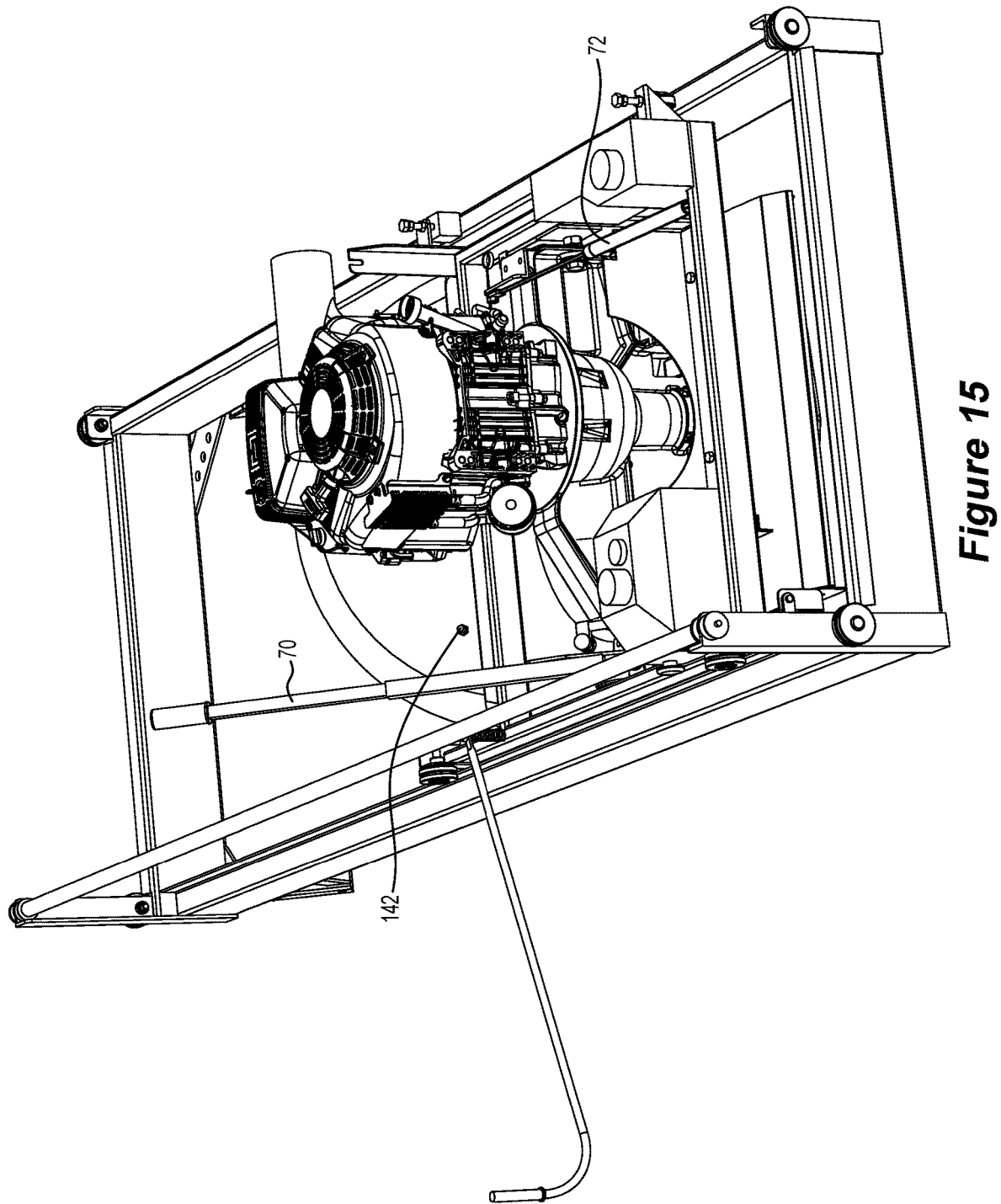
FIG. 15 is a perspective view of the support frame of FIG. 11 with the output shaft oriented in a vertical position and the sawblade oriented in the horizontal cut position.

Additionally, the pivotal mounting may include a gas strut 72 (see FIGS. 5, 14 and 15). The strut 72 has one end connected to the carriage 23a and the other end connected to the pivot body 28. The strut 72 includes a piston and rod assembly which enables the strut to adjust between the two operative positions. The piston and rod assembly is in the form of an oil-filled gas strut which dampens or modulates the speed of pivotal motion throughout the movements between the first and second operative positions. The dampening is constant throughout the stroke ensuring that the transition speed between the first and second operative positions is substantially constant and prevents the engine from bouncing or rushing when it moves down into the first operative position.

Additionally, the gas strut 72 operates as a spring to assist with moving the engine and sawblade assembly from the first operative position to the second operative position by releasing stored potential energy within the gas strut when the engine and sawblade assembly is released from the first operative position. The gas strut 72 helps to counteract the weight of the engine when lifting the engine and sawblade assembly from the first operative position to the second operative position. The gas strut 72 also holds the engine and sawblade assembly in the second operative position. The engine and sawblade assembly are held in the first operative position by the change-over handle 70 being retained by a mechanical catch 74 and also the weight of the engine 30. The weight of the engine 30 is approximately 60 kg while the pivot body 28, coupling including sawshaft 62 and sawblade 29 combined weigh approximately 20 kg. Thus the centre of gravity lies within the engine 30.

A linear actuator could also take the place of the gas strut 72 and the change-over handle 70.

Mechanical Catch

Figure 19:
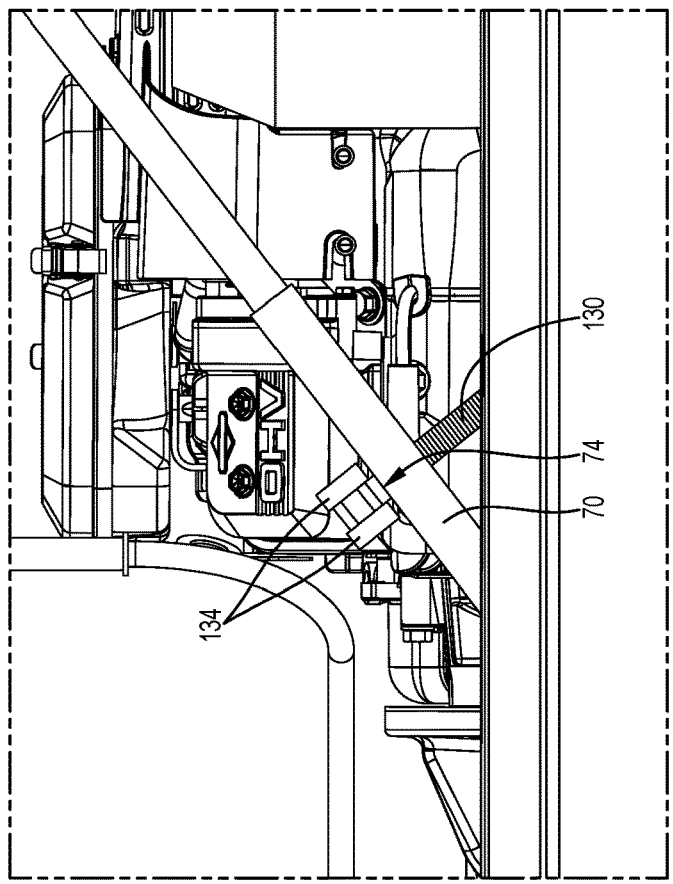
FIG. 19 is a side view of the change-over handle and the catch of FIG. 18.
Figure 18:
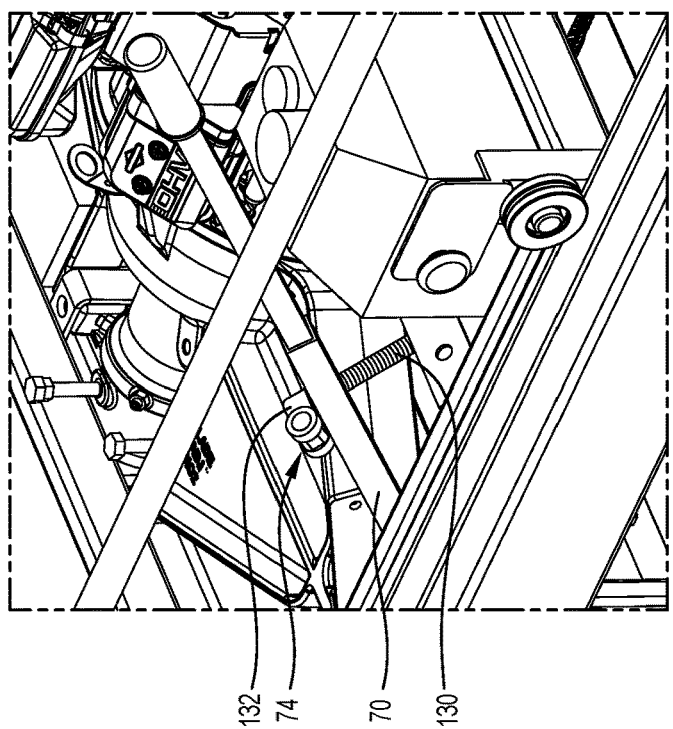
FIG. 18 is a detailed view of the change-over handle and the catch for maintaining the engine with the output shaft in a horizontal configuration.

The mechanical catch 74 is best shown in FIGS. 18 and 19. The mechanical catch 74 is in the form of a finger 130 which projects at an acute angle from the carriage 23a. The finger 130 has a crook portion 132 which provides a mounting for two-spaced bearings 134. The crook portion 132 and the spaced bearings 134 define an overhang. The changeover handle 70 is held beneath the overhang when the changeover handle 70 is in the first operative position.

When it is desired to release the changeover handle 70 from the first operative position, the operator pulls the change-over handle 70 forwardly so that the change-over handle rolls against the spaced bearings 130 to make release of the change-over handle 70 easier. The change-over handle is then free for the operator to pivot the pivot body 28 to move the engine and sawblade assembly to the second operative position. As mentioned, the gas strut 72 holds the engine and sawblade assembly in the second operative position.

Saw Guard

Figure 12:
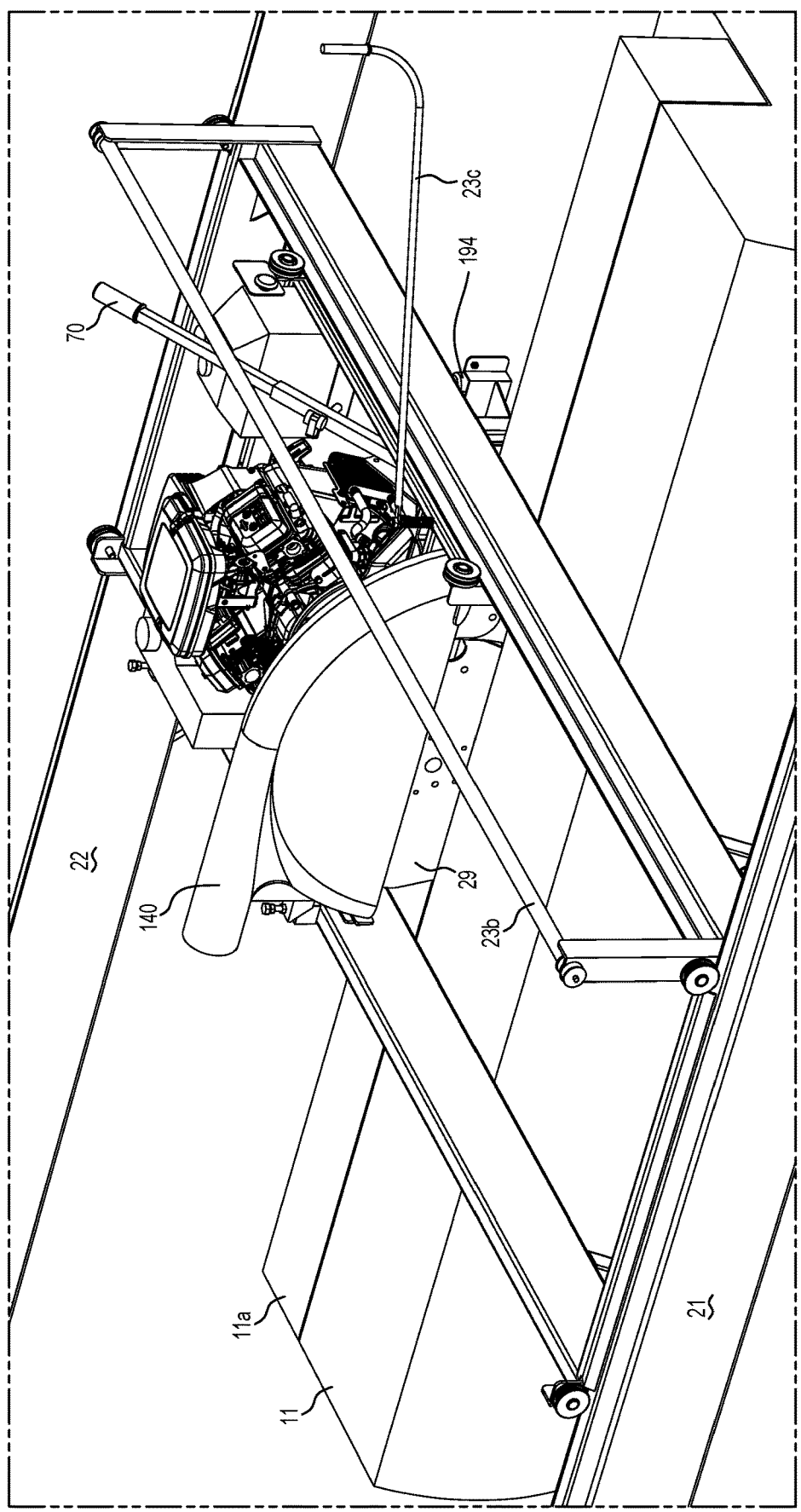
FIG. 12 is an alternative view of the support frame of FIG. 11, with the output shaft shown in the horizontal position and the sawblade in the vertical cut position.

As best shown in FIGS. 11 and 12, a plastic roto-moulded saw guard 140 is provided to enclose an upper half of the sawblade 29 (see FIG. 12). The saw guard 140 has a forward facing exhaust opening 141 to emit sawdust in the direction away from the operator. As will be appreciated from an understanding of FIGS. 13A and 13B, the engine 30 is bulky and in the second operative position (FIG. 13B), the engine 30 would foul with the saw guard 140. However, the saw guard 140 is not required in this position because this sawblade is now below the engine 30. In this position, the saw guard 140 pivots out of the way of the engine 30.

Figure 13A:
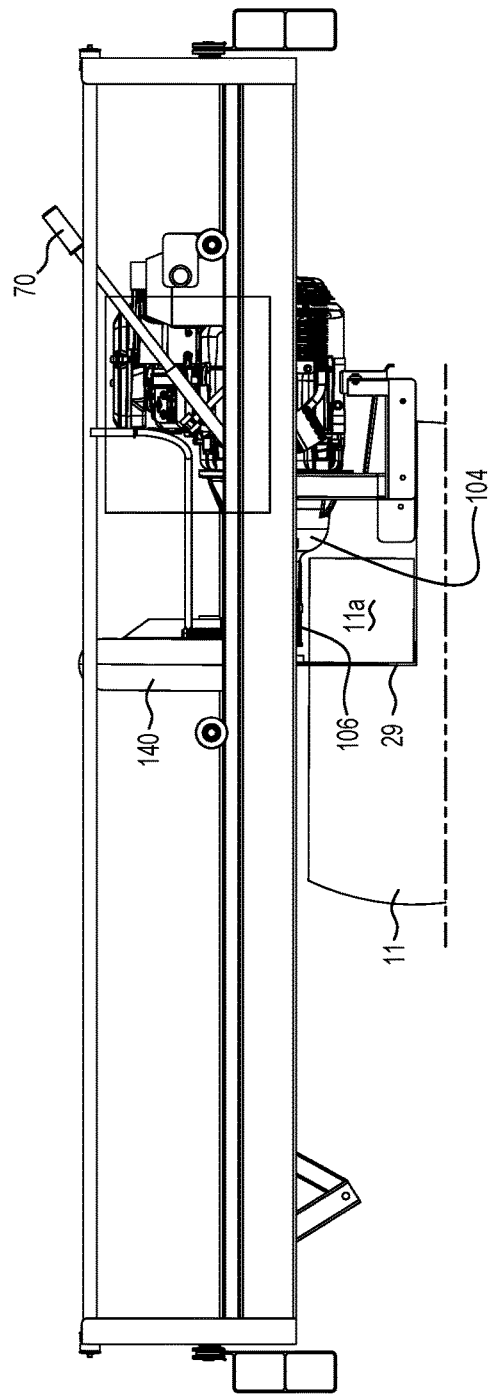
FIG. 13A is a side view of the support frame of FIG. 11 with the output shaft shown in the horizontal position with the sawblade shown in a vertical cut position.

As already mentioned, a riving knife 118 (see FIG. 20) aligns with the sawblade 29. In order to maintain the saw guard in the upright operative position of FIG. 13A, the riving knife 118 contacts an internal projection in the saw guard 140. This may be in the form of a bolt 142 secured to the engine facing side of the saw guard 140. The head of the bolt 142 contacts the riving knife as the pivot body 28 rotates from the second operative position (FIG. 13B) to the first operative position (FIG. 13A). The riving knife 118 thus pushes the saw guard 140 into the operative position as shown in FIG. 13A. The gas strut ensures that the speed of the rotation of the pivot body is controlled as the riving knife contacts the bolt 142.

Figure 13B:
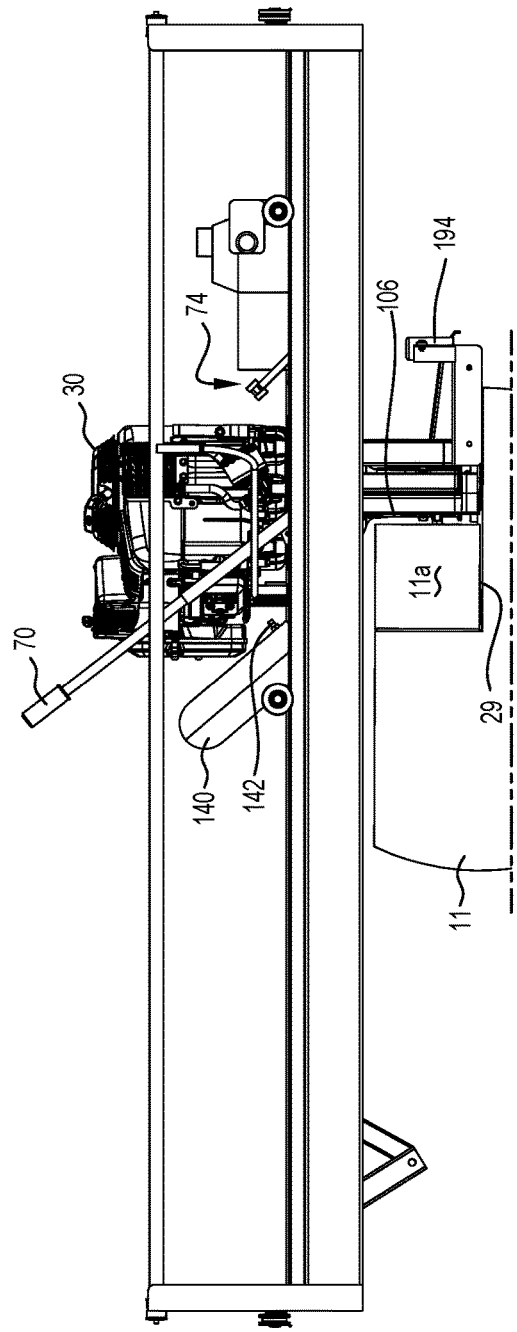
FIG. 13B is a side view of the support frame of FIG. 13A, with the output shaft shown in the vertical position with the sawblade oriented in a horizontal cut position.
Figure 16:
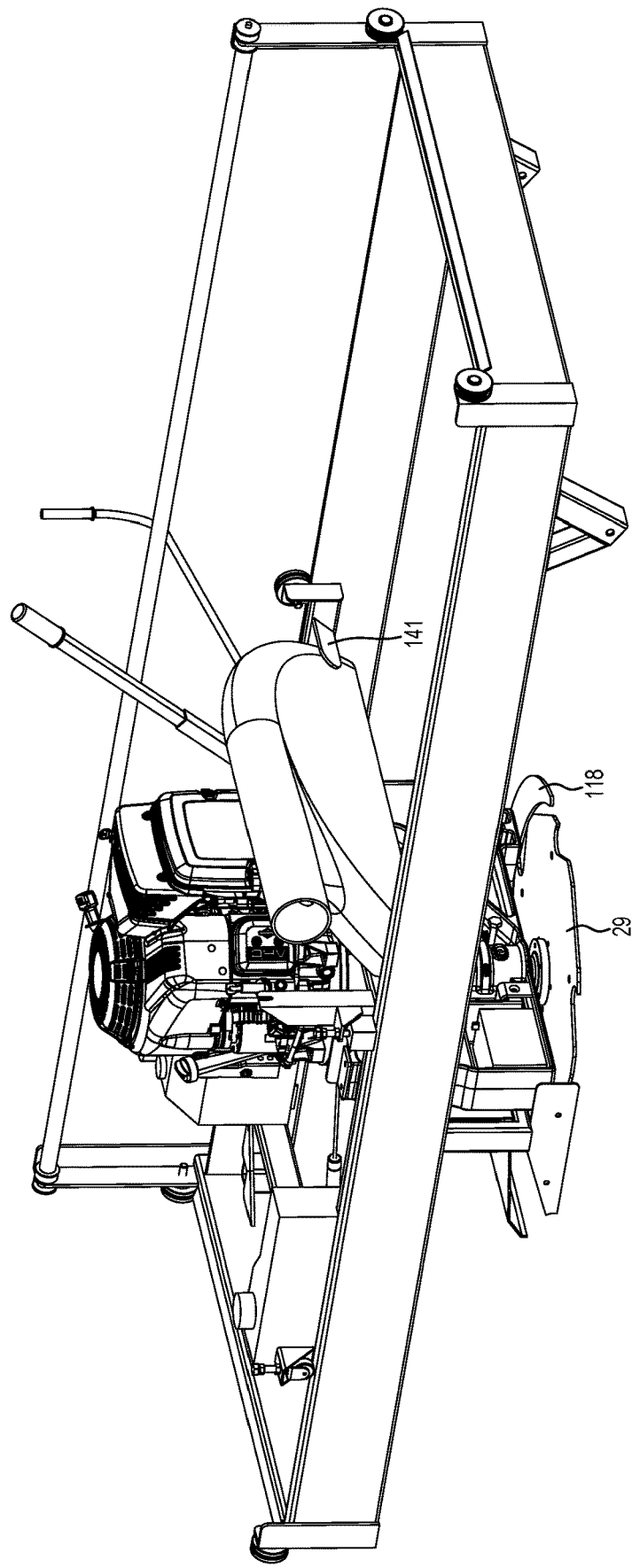
FIG. 16 is an alternative perspective view of the support frame with the engine oriented as per FIG. 15.
Figure 17:
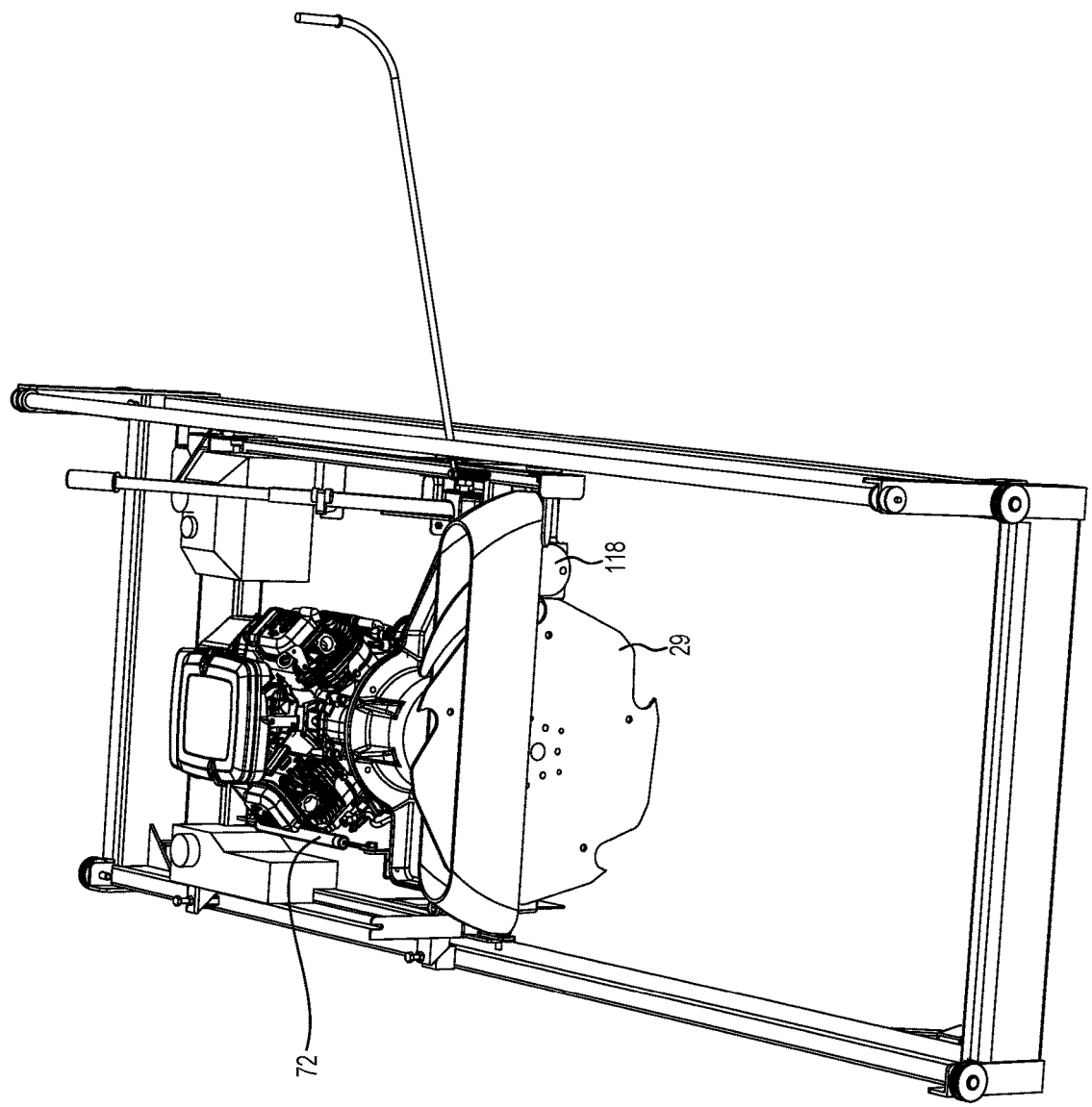
FIG. 17 is an alternative perspective view of the support frame as per FIGS. 11 and 12, except with parts removed for clarity, including an upper portion of the saw guard.

When the assembly is moved from the first operative position of FIG. 13A to the second operative position of FIG. 13B, the riving knife 118 moves away from the bolt 142 and the saw guard 140 simply falls under gravity or is pushed out of the way by the engine 30 and comes to rest against stop 141 (see FIG. 16).

As can be seen from FIG. 12, the sawblade 29 has a series of holes to allow water to drip through and clean the blade. The water hose is not shown.

Low Profile of Pivot Body

As will be understood from an appreciation of FIG. 4C and FIG. 5, the quasi-cylindrical portion 106 of the housing portion 102 is narrower in girth than the bell-shaped portion 104. Referring again to FIG. 13a, when the sawblade is in the first operative position, the quasi-cylindrical portion 106 must pass over the top of the log 11 and therefore must be as slim or low profile as possible and of lesser girth than the bell-shaped portion 104 and also the sawblade hub 60. Additionally, when the assembly is in the second operative position, the cylindrical portion 106 must pass beside the log 11 as shown in FIG. 13B. The quasi-cylindrical portion passes the top of the log on one side and the side of the log on the other side. Therefore, this girth which is transverse to the plate-like form of the pivot body 28 must necessarily be as slim as possible and certainly slimmer than the bell-shaped portion 104 of the housing portion 102 and optionally also the sawblade hub 60.

Once the sawblade 29 has made the vertical cut as shown in FIG. 13a and subsequently the horizontal cut shown in FIG. 13b, a piece of milled timber 11a will be formed. This milled timber 11a can be removed from the log to enable the milling process to continue.

Typically, the log 11 is sawed into planks or beams which run lengthwise in common with the length of the log 11. Each beam or plank is milled off the log 11 in layers moving from right to left from the viewpoint of FIGS. 13a and 13b. When a layer has been completed, the beams 21, 22 are moved downwardly so that the process of cutting the next layer of planks or beams can continue and so on until the milling of the log 11 is complete.

Thus, reverting to FIG. 4D, the profile of the bell-shaped housing portion 102 and the quasi-cylindrical portion 106 relative to the plate-like form of the pivot body 28 can be appreciated. The trumpet-like form of the bell-shaped housing portion 102 and the quasi-cylindrical portion 106 combined, is arranged so that the plane of plate sections 84 align with the diameter of the trumpet-like form 102, 106. Thus the profile of the trumpet-like form 102, 106 is substantially even on both sides. The stiffeners 100, 114 extend from the plate sections 84 on each side of the pivot body an extent which is substantially commensurate with the extent of the quasi-cylindrical portion 106 from each side of the plate sections 84. These features assist to provide the low-profile of the pivot body 28.

The trumpet-like form 102, 106 also extends transversely to the lengthwise direction of the pivot body, dividing the plate-like form into two parts on either side.

The pivot body 28 is specifically designed with a particular sawblade dimension. Otherwise, with an undersized blade, the horizontal and vertical cuts won't intersect. With an oversized blade, the vertical cut will penetrate the layer below which is undesirable.

The sawblade dimension will determine the distance between the mounting portion 116 for the riving knife and the pivot axis 27 to ensure intersecting cuts. The current model is designed for a sawblade 29 having a diameter 530 mm. This is able to cut a beam 11a of approximately 8 inches by 8 inches (approximately 203×203 mm).

Thus, the integrally cast pivot body 28 will precisely locate various components which need to be accurately relatively positioned and/or oriented in order to ensure operation of the sawmill 8. For example, the sawshaft and the engine need to be accurately positioned. As another example, the pivot points need to be precisely located. The sawblade needs to be perpendicular to the pivot axis. The integrally cast pivot body 28 ensures the squareness and trueness of various components.

The pivot body 28 is preferably sand or die cast with two mould halves and an insert for the trumpet-like form of the housing and quasi-cylindrical portions 102, 106.

Engine

Figure 2:
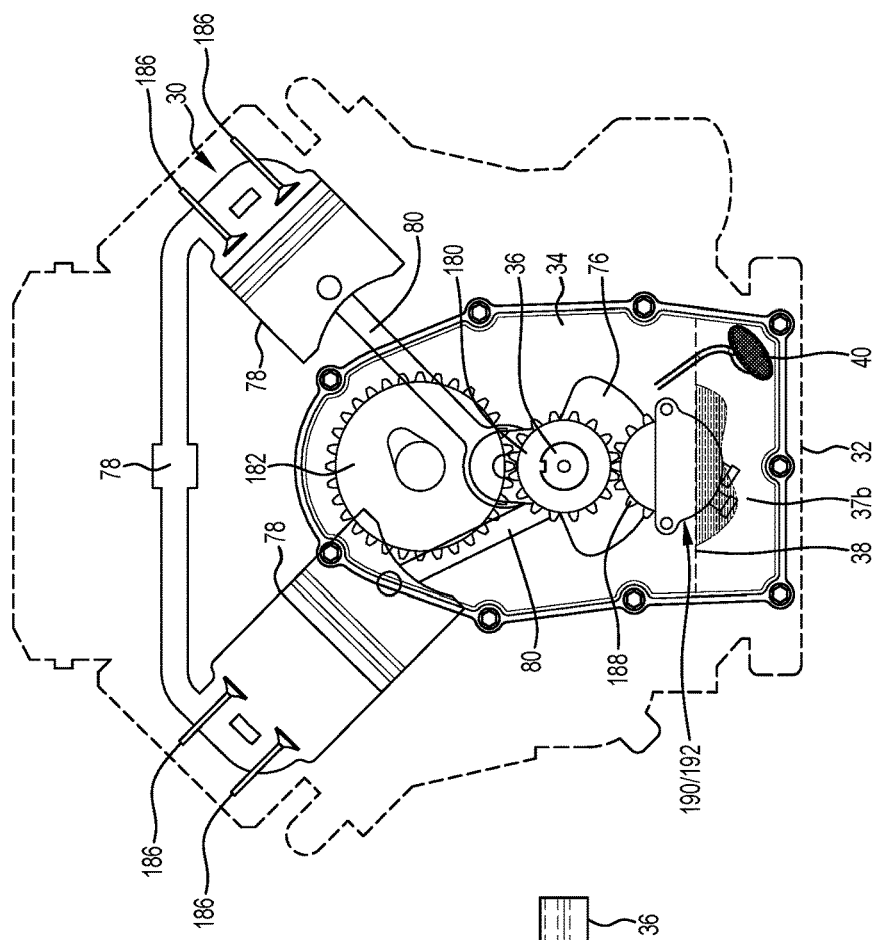
FIG. 2 is an end view of the 4-stroke internal combustion engine of FIG. 1.
Figure 1:
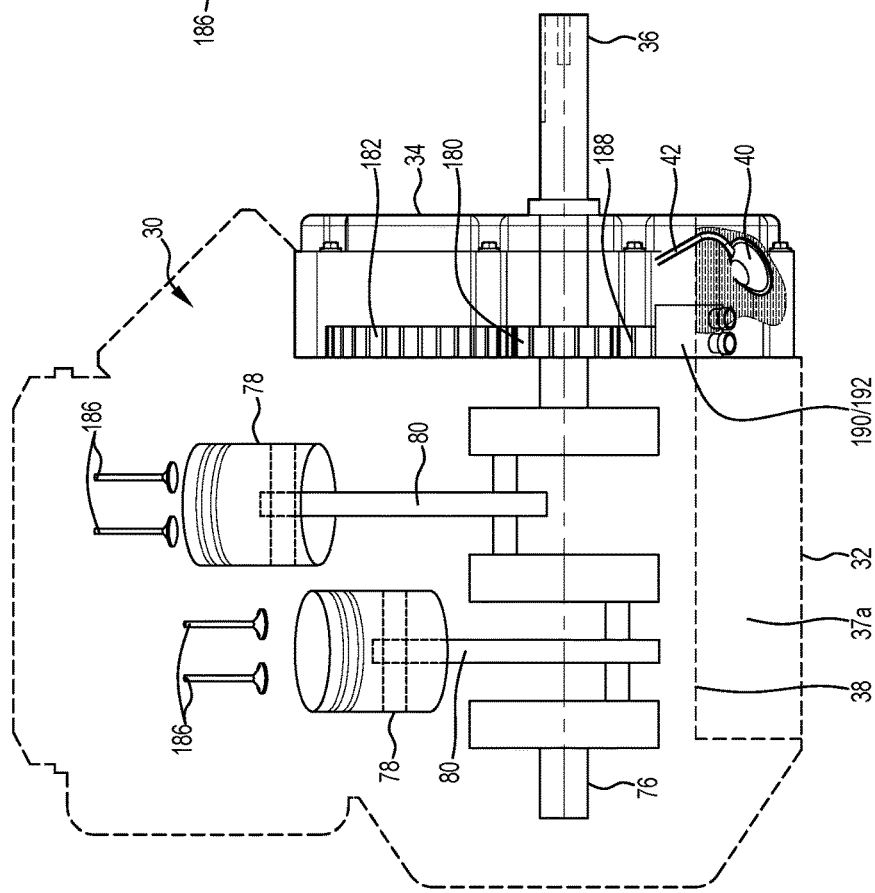
FIG. 1 is a side view of a 4-stroke internal combustion engine showing internal details including a horizontally extending crankshaft.
Figure 3:
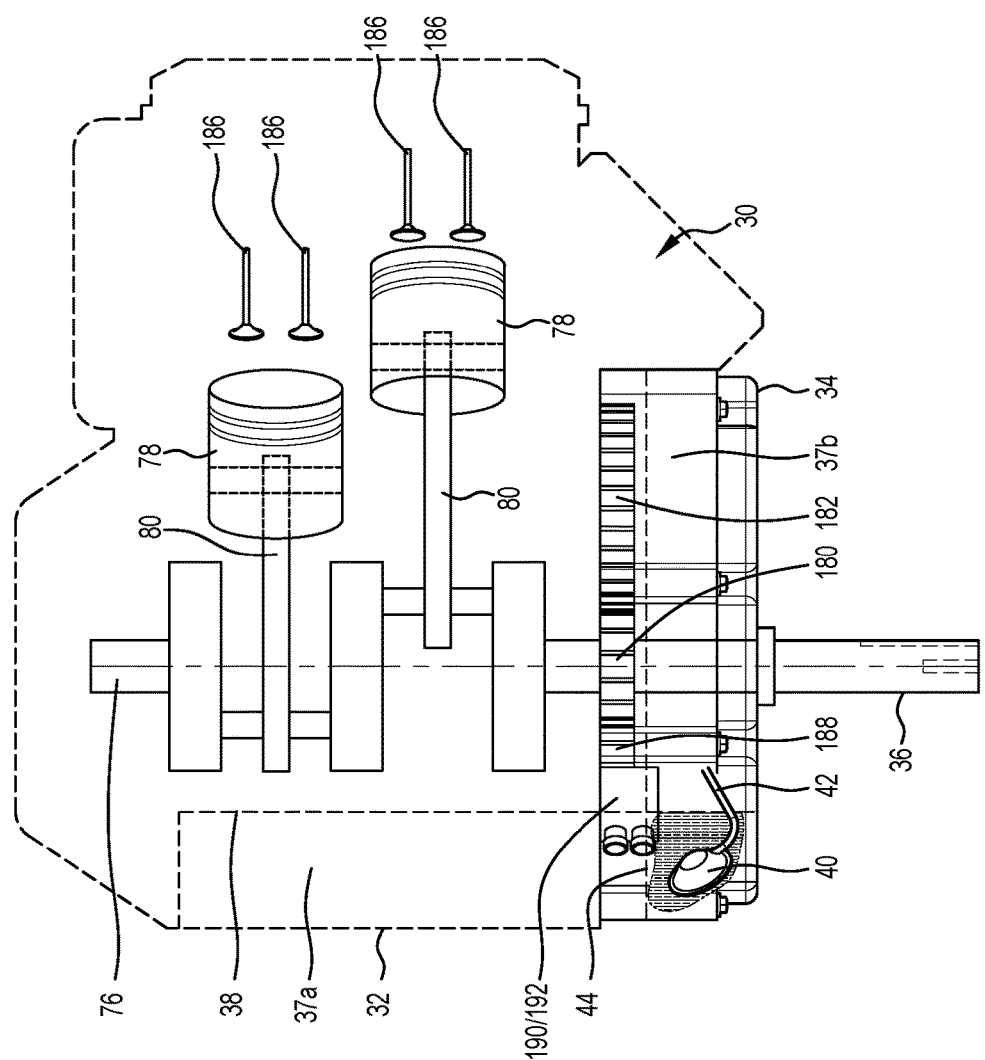
FIG. 3 is a side view of the engine in FIG. 1 showing internal details, except showing the crankshaft vertically oriented.

FIGS. 1-3 illustrate the form of the engine 30 which is a 4-stroke internal combustion (petrol) engine having electronic fuel injection 194 (see FIG. 11). A preferred engine is a 23 horse power, electronic fuel injected, air cooled, V-twin Briggs & Stratton, horizontal shaft engine which has undergone inventive modification in view of the current application. However, single cylinder or V-twin diesel engines are also possible.

The engine 30 includes a crankcase 32 with a closure in the form of a timing cover 34. The timing cover 34 permits assembly of the crankshaft 76, pistons 78, connecting rods 80 and other components into the crankcase 32. The crankshaft 76 includes the output shaft 36 or is connected thereto. The output shaft 36 protrudes through the timing cover 34 as shown. Other components within the crankcase 32 include timing gears including the crank gear 180 and the cam gear 182 by which the camshaft 184 is rotated. The camshaft drives the valves 186 to open and close in a manner which will be known to those familiar with engine technology. The crank gear 180 also drives the oil pump gear 188. The oil pump gear 188 may be protected by an arcuate shroud 190 which extends around the underside of the oil pump gear 188 (when considered from the first operative position) in order to prevent the oil pump gear 188 from being immersed in the sump oil during operation.

As will be understood by those skilled in the field of engines, a predetermined amount of lubricant or oil is supplied to the engine 30 according to the oil capacity of the engine 30, determined by known means.

In the horizontal configuration of the engine 30 as shown in FIGS. 1 and 2 (first operative position), the timing cover 34 will define a portion of the first wet sump region 37a where oil accumulates in the bottom of the crankcase 32. The first liquid level, being the maximum level to which oil accumulates when it is supplied according to the oil capacity of the engine is depicted in FIGS. 1 and 2 by the dotted line 38. Oil thus accumulating in the wet sump 37a is drawn into the lubrication system and is distributed throughout the engine in a manner well-known in the field of engines. The oil falls under gravity into the first wet sump region 37a when the engine and sawblade assembly is in the first operative position. The first wet sump region 37a is open to the crankcase 32.

The lubrication system includes an oil inlet device 40 in the first wet sump region 37a. The oil inlet device 40 may include a filter over the inlet in order to prevent entry of debris into the lubrication system. The oil inlet device 40 is connected to the lubrication system by means of a conduit 42.

As per the discussion of FIG. 5, the engine 30 is designed to pivot about the pivot axis 27 and will thus adopt the position (second operative position) illustrated in FIG. 3 whereby the sawblade 29 is in the substantially horizontal configuration. In this second operative position, the timing cover 34 defines a second wet sump region 37b. Numeral 44 defines the second liquid level being the maximum oil level to which oil accumulates when it is supplied according to the oil capacity of the engine 30. Thus, as can been seen, the second liquid level 44 is shallower than the depth of the timing cover 34.

The oil inlet device 40 remains in the same position relative to the engine 30 and in both operative positions is disposed below the maximum oil level 38, 44. Thus, the oil inlet device 40 remains immersed in oil in the wet sump in both first and second operative positions of the engine 40. On the other hand, the reciprocating parts of the engine 30, including at least the crankshaft 76, the connecting rods 80 and the timing gears are clear of the first liquid level 37a in the first operative position and the second level 37b in the second operative position. This avoids the reciprocating engine parts moving within the wet sump which would create undesirable effects such as oil frothing.

As can be seen, the oil inlet device 40 is disposed in the lower region of the timing cover 34 (and the crankcase 32) to be immersed in oil in both the first and second operative positions of the engine and sawblade assembly 25. Put another way, the oil inlet is disposed in the crankcase 32 at a location which is most closely disposed to the sawblade and additionally, a location which is in a lower region of the engine 30 when the output shaft 36 is disposed in a horizontal configuration. Thus, the oil inlet is disposed in a lower region of the crankcase for the horizontal configuration of the output shaft 36 and in a region most closely positioned relative to the sawblade 29. This happens to coincide with a position within the timing cover 34 which happens to act as a sump in the horizontal configuration of the sawblade 29. Indeed, the intersection of the two criteria provides for the oil inlet 40 to be positioned anywhere along the bottom of the timing cover 34, when viewed from the perspective of FIG. 2. The oil inlet 40 is thus disposed at the intersection of the first wet sump region 37a and the second wet sump region 37b.

One particular and non-limiting manner of achieving the engine configuration is to take the Briggs & Stratton 23 horsepower EFI horizontal shaft engine and substitute the crank shaft and timing cover from a Briggs & Stratton 23 horsepower carburized vertical shaft engine. The adoption of the deeper timing cover 34 (compared to the normal timing cover for the horizontal shaft engine) provides for a sufficient sump depth in the second operative position of the assembly 25. Additionally, the crank shaft 76/output shaft 36 from the B&S vertical engine is longer to accommodate the increased depth of the timing cover/sump 34. The oil inlet device 40 is a newly designed and purpose-built part to meet the need to position the oil inlet 40 in the intended location at the intersection of the first and second wet sump regions 37a and 37b.

Engine Coupling to Sawshaft

FIGS. 4A and 4C illustrate the coupling of the engine 30 to the sawblade 29. The coupling includes centrifugal clutch 50, cush drive 52 and outrigger bearing 54. The centrifugal clutch 50, cush drive 52 and outrigger bearing 54 are disposed within the housing portion 102 which, including the bell-shaped portion 104 and the quasi-cylindrical portion 106, is shaped as a trumpet.

The sawblade 29 is removably attached to the saw hub 60 at the distal end of the saw shaft 62 by means of bolts (not shown). The saw hub 60 is integrally formed with the saw shaft 62 which is connected to the outboard end of the cush drive 52.

As shown in more detail in FIG. 4C, the output shaft 36 extends through the centrifugal clutch 50 where it is received within the inner race of an inboard bearing 150. The outer race of the inboard bearing 150 is received in the cush drive 52.

The cush drive 52 has a cush collar 162 which is provided with 5 cylindrical recesses which are arranged concentrically about the central rotational axis and at equal spacing along a circle which is concentric with the rotational axis. Each of these cylindrical recesses 152 receives a steel pin 154 secured in the clutch body 50. Surrounding each steel pin 154 is a series of toroidal rubber blocks which transmit torque between the clutch body 50 and the cush collar 162 of the cush drive 52 in a manner that provides dampening between the parts in order to reduce wear and fatigue of the metal components. The cush drive 52 provides the torque while the bearing 150 ensures the alignment.

The cush collar 162 also has a central recess 158 which receives the inboard end of the saw shaft 62. The inboard end of the saw shaft 62 is threaded and is secured to the outboard end of the cush collar 162 by means of a lock nut 160 and by means of the outboard end of the cush collar 162 being internally threaded. The lock nut 160 is provided as an additional measure of safety.

At the outboard end of the quasi-cylindrical portion 106, an internal shoulder 164 is provided against which the outrigger bearing 54 is seated. The retaining sleeve 166 extending from the cush collar 162 52 bears against the inner race of the outrigger bearing 54. The spacer sleeve 166 is too long or an interference fit between the cush collar 162 and the inner race so as to force the inner race of the bearing 54 into position against the shoulder 164.

The outer race of the bearing 54 is held in position by the retaining sleeve 168. The retaining sleeve 168 has threaded holes 170 to enable engagement with retrieval pins for servicing of the bearing 54. Additionally, it can be seen that the inboard end of the retaining sleeve 168 is provided with a circumferential bevel 172 adjacent the outer periphery. The quasi-cylindrical portion 106 is provided with a circumferential boss 174 having 2 pairs of diametrically opposed internally threaded holes which are equi-circumferentially spaced. Grub screws (not shown) are received in the internally threaded holes to bear against the circumferential bevel 172 to retain the retaining sleeve 168 in position.

It will be appreciated that the inboard bearing 150 is substantially inactive while the blade 29 is rotating. However, during idling of the engine 30, the rotation of the blade 29 is stopped and accordingly, they will be relative movement between the bearing races. Conversely, the outrigger bearing 54 is operational while the blade 29 is spinning. However, during idling, there is little or no relative movement while the blade 29 is stationary.

As shown in FIGS. 4C and 4D, the cylindrical housing portion 106 includes a boss 176 for an adjustment screw (not shown). The adjustment screw strikes against the carriage 23A when the pivot body 28 is in the first operative position. The adjustment screw thereby allows for fine adjustments for the blade orientation in the vertical cut position.

Figure 4F:
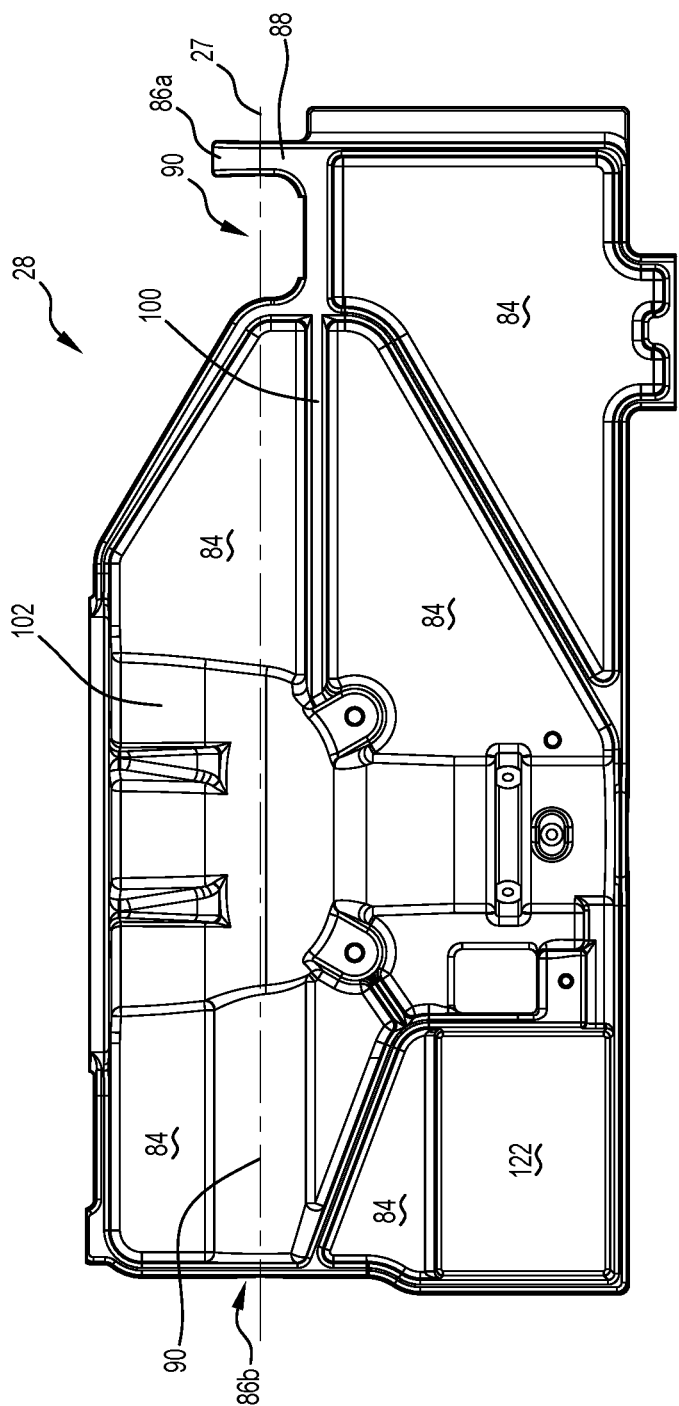
FIG. 4F is a top view of the pivot body of FIG. 4D.
Figure 4G:
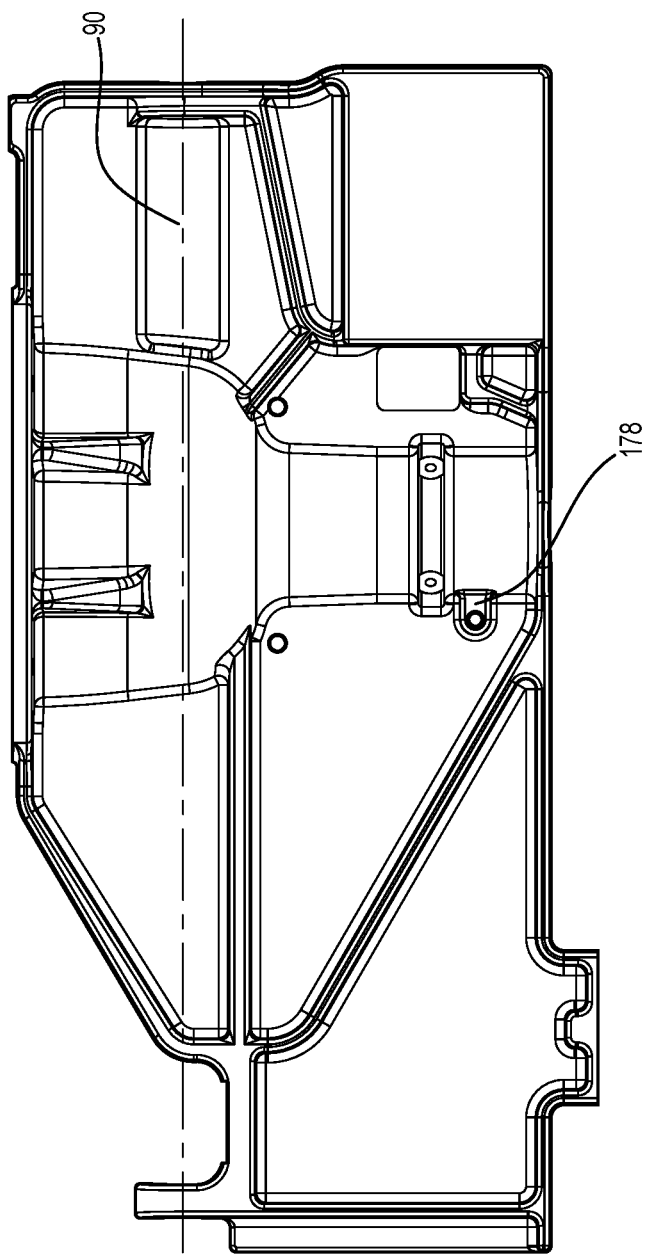
FIG. 4G is an underside view of the pivot body of FIG. 4D.

Similarly, as shown in FIGS. 4F and 4G, another boss 178 is provided for a second adjustment screw. This adjustment screw protrudes from the top of the pivot body 28 shown in FIG. 4F and extends through to the other side of the pivot body through the boss 178. The other end of the adjustment screw strikes against a portion of the carriage 23A when the pivot body 28 is in the second operative position. This allows for fine adjustment of the orientation of the sawblade in the horizontal cut position.

The foregoing describes one embodiment of the present disclosure and modifications may be made thereto without departing from the scope of the disclosure. For instance, while the description above is applied to the Lucas Mill version of a portable sawmill, the disclosure is applicable to any swing blade portable sawmill with a circular saw. Thus, the present disclosure can be applied to other frame designs.

The invention claimed is:

1. A sawmill including:
   an engine or motor having an output shaft exiting therefrom for driving a sawblade, the output shaft having a longitudinal axis;
   a support apparatus for supporting the engine or motor, the support apparatus including a support framework, wherein the entire engine or motor is configured to selectively pivot relative to a portion of the support framework, while the portion of the support framework remains stationary, between a first operative position with the longitudinal axis extending at a first angle, and a second operative position with the longitudinal axis extending at a second angle different to the first angle, the support apparatus further including a pivot body pivotably mounting the entire engine or motor to said portion of the support framework, the pivot body including:
   pivot portions for pivotable mounting of the pivot body about a pivot axis to said portion of the support framework;
   a mounting portion to which the engine or motor is secured, the mounting portion surrounding the output shaft; and
   a housing portion to accommodate the output shaft exited from the engine or motor, such that the output shaft exited from the engine or motor is enclosed between the pivot body and the engine or motor.

2. The sawmill as claimed in claim 1, wherein the pivot body including the pivot portions, the mounting portion and the housing portion is a unitarily formed cast part.

3. The sawmill as claimed in claim 1, wherein the mounting portion is formed as a flange at the edge of the housing portion.

4. The sawmill as claimed in claim 1, wherein the first and second operative positions extend substantially orthogonal to each other.

5. The sawmill as claimed in claim, 4 wherein the first and second operative positions are the only selectable operative positions.

6. The sawmill as claimed in claim 5, wherein, in the first operative position, the longitudinal axis of the output shaft is arranged substantially horizontally and in the second operative position, the longitudinal axis of the output shaft is arranged substantially vertically to extend below the engine or motor.

7. The sawmill as claimed in claim 6, wherein the pivot portions of the pivot body define the pivot axis which extends transversely to the longitudinal axis of the output shaft and is substantially coincident with the longitudinal axis.

8. The sawmill as claimed in in claim 1, wherein the output shaft is in-line coupled to a saw shaft via a clutch and the housing portion surrounds the clutch.

9. The sawmill as claimed in claim 8, wherein the output shaft is in-line coupled to a saw shaft via a cush-drive and the housing portion surrounds the cush-drive.

10. The sawmill as claimed in claim 9, wherein the saw shaft and/or the output shaft is supported by a bearing which is surrounded by the housing portion.

11. The sawmill as claimed in claim 1, wherein the pivot body is substantially planar in form with the housing portion being centrally disposed to divide the pivot body into a first part and a second part on opposite sides of the housing portion.

12. The sawmill as claimed in claim 11, wherein the pivot body includes stiffening beam portions on the first part and the second part of the pivot body.

13. The sawmill as claimed in claim 12, wherein the stiffening beam portions include at least one stiffening beam substantially aligned with the pivot axis of the pivot body.

14. The sawmill as claimed in claim 1, wherein the pivot body includes a battery mounting or receptacle for mounting a battery on the other side of the pivot axis to the engine or motor.

15. The sawmill as claimed in claim 1, wherein the sawmill is a portable sawmill of the type which can be transported to a remote location with the support framework being assembled over the top of a felled log in situ.

16. The sawmill as claimed in claim 15, wherein the entire engine or motor is selectively manually pivotable between the first and second operative positions.

17. The sawmill as claimed in claim 16, further including a transfer apparatus for controlling pivoting between the first and second operative positions wherein the transfer apparatus dampens the movement from at least the second operative position to the first operative position and is arranged to provide lift assistance throughout the movement from the first operative position to the second operative position.

18. The sawmill as claimed in claim 17, wherein the transfer device is connected between said portion of the support framework and the pivot body.

19. The sawmill as claimed in claim 17, wherein the transfer device is in the form of a gas strut or a linear actuator arranged to provide substantially constant dampening from the second operative position to the first operative position and lift assistance throughout the movement from the first operative position to the second operative position.

20. The sawmill as claimed in claim 17, wherein the transfer device includes a dampener to provide substantially constant dampening from the second operative position to the first operative position and a mechanical strut to provide lift assistance throughout the movement from the first operative position to the second operative position.

21. The sawmill as claimed in claim 1, wherein the mounting portion and the housing portion of the pivot body extend circumferentially completely around the output shaft.

22. The sawmill as claimed in claim 1, wherein the pivot body is directly and fixably attached to the engine or motor, and wherein the output shaft extends axially from the engine or motor through the mounting portion of the pivot body and into the housing portion of the pivot body.

23. A sawmill, comprising:
an engine or motor having an output shaft exiting therefrom for driving a sawblade, the output shaft having a longitudinal axis;
a support apparatus for supporting the engine or motor, the support apparatus including a support framework, the engine or motor being selectively pivotable relative to a portion of the support framework between a first operative position with the longitudinal axis extending at a first angle, and a second operative position with the longitudinal axis extending at a second angle different to the first angle,
the support apparatus further including a pivot body to pivotably mount the engine or motor to said portion of the support framework, the pivot body including:
pivot portions for pivotable mounting of the pivot body about a pivot axis to said portion of the support framework;
a housing portion having a mouth to receive the output shaft of the engine or motor, wherein the housing portion includes a bell-shaped portion and a quasi-cylindrical portion, wherein the quasi-cylindrical portion has a girth that is narrower than a girth of the bell-shaped portion; and
a peripheral mounting portion at the mouth of the housing portion for mounting of the engine or motor such that the exited output shaft is enclosed between the pivot body and the engine or motor.

24. The sawmill as claimed in claim 1, wherein the engine or motor has a housing and the output shaft extends axially from the housing of the engine or motor through the mounting portion of the pivot body and into the housing portion of the pivot body.

25. The sawmill as claimed in claim 24, wherein the engine or motor includes a crankshaft disposed in the housing, and wherein the output shaft extends from the crankshaft and the housing of the engine or motor.

* * * * *